US009998664B1

(12) United States Patent
Long et al.

(10) Patent No.: US 9,998,664 B1
(45) Date of Patent: Jun. 12, 2018

(54) METHODS AND SYSTEMS FOR NON-CONCENTRIC SPHERICAL PROJECTION FOR MULTI-RESOLUTION VIEW

(71) Applicant: Sliver VR Technologies, Inc., Cupertino, CA (US)

(72) Inventors: Jieyi Long, Santa Clara, CA (US); Mitchell C. Liu, Los Altos, CA (US)

(73) Assignee: Sliver VR Technologies, Inc., Cupertino, CA (US)

( * ) Notice: Subject to any disclaimer, the term of this patent is extended or adjusted under 35 U.S.C. 154(b) by 0 days. days.

(21) Appl. No.: 15/893,434

(22) Filed: Feb. 9, 2018

Related U.S. Application Data

(60) Provisional application No. 62/522,505, filed on Jun. 20, 2017.

(51) Int. Cl.
*A63F 13/85* (2014.01)
*H04N 5/232* (2006.01)
(Continued)

(52) U.S. Cl.
CPC ......... *H04N 5/23238* (2013.01); *A63F 13/25* (2014.09); *A63F 13/85* (2014.09);
(Continued)

(58) Field of Classification Search
CPC .......... H04N 5/23238; H04N 13/0055; H04N 13/0282; A63F 13/23; A63F 13/85
See application file for complete search history.

(56) References Cited

U.S. PATENT DOCUMENTS 5,703,961 A * 12/1997 Rogina ................. G06K 9/209
348/E13.014
6,327,381 B1 * 12/2001 Rogina ................. G06T 15/10
348/E13.014
(Continued)

OTHER PUBLICATIONS

Evgeny Kuzyakov, "End-to-end optimizations for dynamic streaming," Facebook Code, Feb. 22, 2017, available at https://code.facebook.com/posts/637561796428084/end-to-end-optimizations-for-dynamic-streaming/, last accessed Feb. 9, 2018.
(Continued)

*Primary Examiner* — Corbett B Coburn
(74) *Attorney, Agent, or Firm* — American Patent Agency PC; Daniar Hussain; Xiaomeng Shi

(57) ABSTRACT

Methods and systems for generating multi-resolution spherical videos, comprising receiving a plurality of video recordings recorded by a viewpoint, wherein the viewpoint is a camera array comprising a plurality of cameras arranged around a viewpoint center; and generating a spherical video from the plurality of video recordings by non-concentric spherical projection, wherein each of the plurality of video recordings is mapped to respective portions of a projection sphere, wherein a center of the projection sphere is positioned at a non-zero distance away from the viewpoint center, and wherein a visual resolution of the spherical video in a first portion of the projection sphere is higher than a visual resolution of the spherical video in a second portion of the projection sphere. Embodiments of the present invention derive high resolution displays of selected viewpoints concurrently with lower resolution displays of surrounding environments, therefore optimizing between visual resolution and bandwidth constraints.

26 Claims, 24 Drawing Sheets

(51) Int. Cl.
*H04N 13/02* (2006.01)
*A63F 13/25* (2014.01)
*H04N 13/00* (2018.01)

(52) U.S. Cl.
CPC ..... *H04N 13/0055* (2013.01); *H04N 13/0282* (2013.01); *A63F 2300/8082* (2013.01)

(56) References Cited

U.S. PATENT DOCUMENTS

| | | | |
|---|---|---|---|
| 9,294,757 B1* | 3/2016 | Lewis | H04N 13/0242 |
| 9,607,428 B2 | 3/2017 | Li | |
| 9,721,393 B1* | 8/2017 | Dunn | G06T 19/006 |
| 2016/0112713 A1* | 4/2016 | Russell | H04N 19/20 375/240.03 |
| 2016/0150212 A1 | 5/2016 | Moura et al. | |
| 2016/0241836 A1 | 8/2016 | Cole et al. | |
| 2016/0353146 A1 | 12/2016 | Weaver et al. | |
| 2017/0084073 A1 | 3/2017 | Pio et al. | |
| 2018/0075634 A1* | 3/2018 | Kandler | G06T 11/60 |
| 2018/0091735 A1* | 3/2018 | Wang | H04N 5/23238 |

OTHER PUBLICATIONS

Evgeny Kuzyakov et al., "Optimizing 360 Video for Oculus," Facebook for Developers, Apr. 13, 2017, available at https://developers.facebook.com/videos/f8-2016/optimizing-360-video-for-oculus/, last accessed Jul. 17, 2017.

Evgeny Kuzyakov et al., "Next-generation video encoding techniques for 360 video and VR," Faceobok code, Jan. 21, 2016, available at https://code.facebook.com/posts/1126354007399553/next-generation-video-encoding-techniques-for-360-video-and-vr/, last accessed Jul. 17, 2017.

Evgeny Kuzyakov, "GitHub—facebook/transform360: Transform360 is an equirectangular to cubemap transform or 360 video," Github, available at https://github.com/facebook/transform360, last accessed Jul. 17, 2017.

Chip Brown, "Bring pixels front and center in VR video," Google AR and VR Blog, Mar. 14, 2017, available at https://blog.google/products/google-vr/bringing-pixels-front-and-center-vr-video/, last accessed Feb. 9, 2018.

Anjul Patney et al., "Towards Foveated Rendering for Gaze-Tracked Virtual Reality," ACM Transactions on Graphics (TOG), Nov. 11, 2016, 35 No. 6, p. 179, ACM, New York, USA.

Alex Vlachos, "Advanced VR Rendering Performance," Game Developers Conference, Mar. 14-18, 2016, GDC Vault, available at https://www.gdcvault.com/play/1023522/Advanced-VR-Rendering, last accessed Feb. 9, 2018.

Yunhee Son, "SK Telecom's demonstration of low-latency and high-quality VR streaming," NETMANIAS, Oct. 16, 2016, available at https://www.netmanias.com/en/post/korea_ict_news/10839/5g-sk-telecom-vr/sk-telecom-s-demonstration-of-low-latency-and-high-quality-vr-streaming, last accessed Feb. 9, 2018.

Xavier Corbillon et al., "Viewport-adaptive Navigable 360-Degree Video Delivery," 2017 IEEE International Conference on Communications (ICC), May 21, 2017, p. 1-7, IEEE, New York, USA.

* cited by examiner

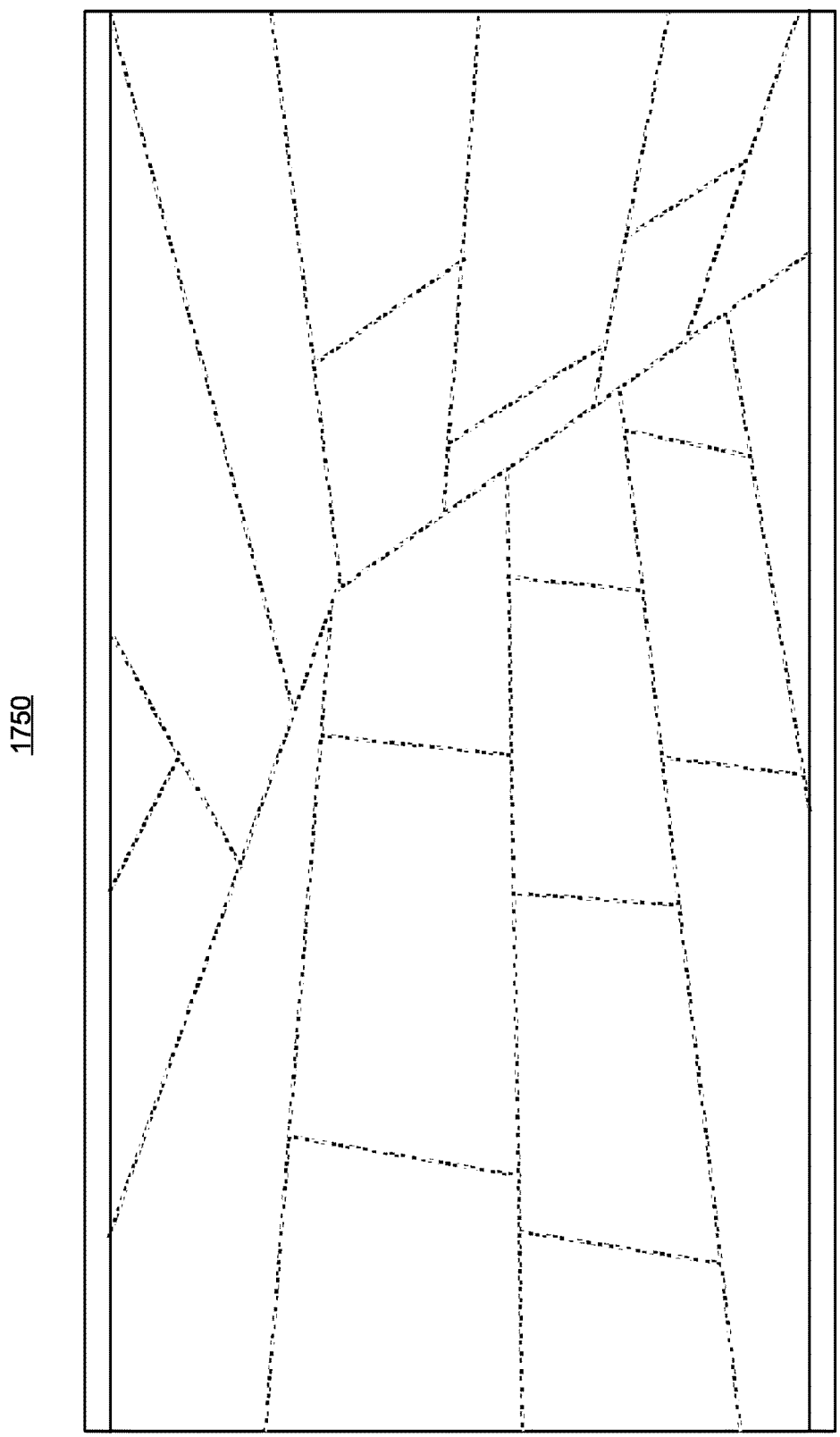

METHODS AND SYSTEMS FOR NON-CONCENTRIC SPHERICAL PROJECTION FOR MULTI-RESOLUTION VIEW

REFERENCE TO RELATED APPLICATIONS

This application is a non-provisional of and claims the benefit of priority to provisional application U.S. Ser. No. 62/522,505, filed on 20 Jun. 2017, entitled "Methods and Systems for Non-Concentric Spherical Projection for Multi Resolution View," the entire disclosure of which is incorporated by reference in its entirety herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of immersive media content generation, and pertain particularly to methods and systems for spherical video generation for live cast and replay, in virtual reality (VR), augmented reality (AR), and other immersive environments.

BACKGROUND OF THE INVENTION

The statements in this section may serve as a background to help understand the invention and its application and uses, but may not constitute prior art.

Modern computing technology have brought in a new era of immersive experiences, with virtual reality, augmented reality, and other immersive environments that blur the boundary between physical and digital space. Whether playing a computer video game, watching a sports event, or exploring 3D models, immersion enhances the experience by making it engaging, interactive, and realistic, with images, sounds, and haptic feedbacks that establish the user's presence in an immersive three-dimensional (3D) environment. For example, 360-degree panorama videos taken with action cameras are readily available on video sharing websites such as YouTube for viewers to experience action adventures such as skydiving and car racing. Virtual reality and augmented reality have seen many uses in applications such as gaming, movies and television, architecture, and telepresence. Yet ground-up development of immersive media content for mass mainstream adoption is still non-trivial and expensive.

A critical bottleneck in immersive media content generation and distribution is the enormous amount of data that need to be generated and transmitted from a media content server to viewers to build a 360-degree environment with high resolution, high framerate, and low latency. For one, the full 360-degree horizontal field of view is twice the human visual field for binocular vision, while conventional displays occupy only a portion of the human visual field. For two, with dedicated head-mounted displays, at standard resolutions, individual pixels on the displays become noticeable since VR headsets place display screens or panels within an inch of the eye, making images blurry and small texts close to impossible to read. For three, at low or standard refresh rates, a user in motion may experience sensory conflict, a disparity between what is expected and what is seen on screen, thus triggering motion sickness. In short, improved visual fidelity and imperceptible delays are desirable for providing accurate and realistic immersive environments while also limiting or avoiding motion sickness. Furthermore, to make the immersive experience more authentic, dedicated headsets are preferred to be wireless, a design solution yet to become practical because of limitations on hardware performance and data throughput. Thus, tradeoffs among computing power, data transfer rates, processing capabilities, and user experience and comfort become extremely important when perfecting the immersive experience.

Within the computer video gaming universe, while development of VR-games is inherently challenging due to the reasons discussed above, converting existing video games and eSport platforms into their VR counterparts is also known for being very difficult. Traditional controls and user interfaces often do not work well in VR, while simulation sickness and latency also need to be taken into account. Moreover, 360-degree rendering and recording of an existing 3D game is generally too resource intensive for low-end platforms or user devices, where rendering, compressing, streaming, and even replaying of 360-degree videos necessitate high processing power, careful memory management, and bandwidth optimization. Furthermore, production-ready offline rendering systems can produce 360 panoramas for game replay in a VR environment, but such systems are generally incapable of live capture and streaming.

Therefore, in view of the aforementioned difficulties, there is an unsolved need to make it easy to capture, record, stream, replay, and broadcast live or off-line immersive media contents, including game plays of non-VR and VR video games in virtual reality environments. In addition, it would be an advancement in the state of the art of immersive media content generation and distribution to render with high visual fidelity while creating minimal delay and data transfer overheads. It is against this background that various embodiments of the present invention were developed.

BRIEF SUMMARY OF THE INVENTION

A system is provided for rendering 360-degree, spherical video, for streaming, replaying, or live-playing with multi-resolution view.

More specifically, in one aspect, one embodiment of the present invention is a system for generating a spherical video for multi-resolution view. The system includes a processor, and a non-transitory physical medium for storing program code, the non-transitory physical medium accessible by the processor, and the program code when executed causes the processor to receive a plurality of video recordings recorded by a viewpoint, where the viewpoint is a camera array comprising a plurality of cameras arranged around a viewpoint center, and where each camera faces a different direction away from the viewpoint center; and generate a spherical video from the plurality of video recordings by non-concentric spherical projection, where each of the plurality of video recordings is mapped to respective portions of a projection sphere, where a center of the projection sphere is positioned at a non-zero distance away from the viewpoint center, and where a visual resolution of the spherical video in a first portion of the projection sphere is higher than a visual resolution of the spherical video in a second portion of the projection sphere.

A second embodiment of the present invention is a method for generating spherical video for multi-resolution view, comprising the steps of receiving a plurality of video recordings recorded by a viewpoint, where the viewpoint is a camera array comprising a plurality of cameras arranged around a viewpoint center, and where each camera faces a different direction away from the viewpoint center; and generating a spherical video from the plurality of video recordings by non-concentric spherical projection, where each of the plurality of video recordings is mapped to respective portions of a projection sphere, and where a center of the projection sphere is positioned at a non-zero distance away from the viewpoint center, where a visual resolution of the spherical video in a first portion of the projection sphere is different from a visual resolution of the spherical video in a second portion or the projection sphere.

A third embodiment of the present invention is a non-transitory physical medium for storing program code, the program code executable by a processor to execute a process for generating multi-resolution spherical videos, the process comprising steps to receive a plurality of video recordings recorded by a viewpoint, where the viewpoint is a camera array comprising a plurality of cameras arranged around a viewpoint center, and where each camera faces a different direction away from the viewpoint center; and generate a spherical video from the plurality of video recordings by non-concentric spherical projection, where each of the plurality of video recordings is mapped to respective portions of a projection sphere, where a center of the projection sphere is positioned at a non-zero distance away from the viewpoint center, and where a visual resolution of the spherical video in a first portion of the projection sphere is different from a visual resolution of the spherical video in a second portion or the projection sphere.

In some embodiments, the non-concentric spherical projection is performed by generating a transitional video from the plurality of video recordings by a concentric spherical projection, where each of the plurality of video recordings is mapped to respective portions of a transitional sphere centered at the viewpoint center; and mapping from the transitional sphere to the projection sphere.

In some embodiments, the program code when executed further causes the processor to select one of a plurality of camera arrays as the viewpoint, where each camera array comprises a plurality of cameras arranged around a center of the camera array, and where each camera of each camera array faces a different direction, away from the center of the camera array. In some embodiments, the selection of the viewpoint is based on a location within a map. In some embodiments, each camera array is positioned at a predetermined location, and each predetermined location is selected from the group consisting of a static location within a game map, a tracking location associated with an object, a dynamic location controlled by a broadcaster, and a dynamic location controlled by a spectator.

In some embodiments, at least one camera of the camera array is a virtual camera. In some embodiments, the camera array is a virtual camera array, and the plurality of video recordings is recorded from a game play of a source computer game. In some embodiments, the virtual camera array was inserted into the source computer game using a Software Development Kit (SDK) or a game connector module.

In some embodiments, the camera array is a physical camera array.

In some embodiments, the source computer game is selected from the group consisting of 2D games and 3D games, and wherein the source computer game lacks spherical video output. In some embodiments, the source computer game is a virtual reality computer game that comprises spherical video output.

In some embodiments, each projected pixel on the projection sphere is mapped from a source pixel in a source recording from the plurality of video recordings, and the source pixel is a point of intersection between the source recording, and a line segment connecting the projected pixel on the projection sphere and the center of the viewpoint.

In some embodiments, the non-zero distance is measured by a normalized variable t, the projection sphere is a unit sphere parameterized by spherical coordinates θ and φ, for each projected pixel located at Q=(cos θ sin φ, cos θ cos φ, −sin θ) on the unit sphere, the source pixel is located at a normalized coordinate (u,v), where d is a constant based on a normalized distance of the source recording from the center of the viewpoint, where w, and h are constants based on a planar size of the source recording, where β is a constant based on an orientation of the source recording relative to the center of the viewpoint, and where $\varphi' = \sin^{-1}[(\cos\theta \sin q)/\sqrt{\cos^2\theta + 2t\cos\theta\cos\varphi + t^2}]$, $\theta' = \tan^{-1}[\sin\theta/\sqrt{\cos^2\theta + 2t\cos\theta\cos\varphi + t^2}]$, $f(\theta',\varphi') = (\cos\beta \tan\theta' - \sin\beta \cos\varphi')/(\sin\beta \tan\theta' + \cos\beta \cos\varphi')$, $u = (d/w) \cdot [(\sin\beta + f\cos\beta)\sin\varphi'/\tan\theta'] + \frac{1}{2}$, and
$v = (d/h) \cdot f + \frac{1}{2}$.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 17B is an exemplary screenshot of a low-resolution back direction of the video game play referenced in FIG. 17A, according to one embodiment of the present invention.

DETAILED DESCRIPTION OF THE INVENTION

Definitions

Figure 1:
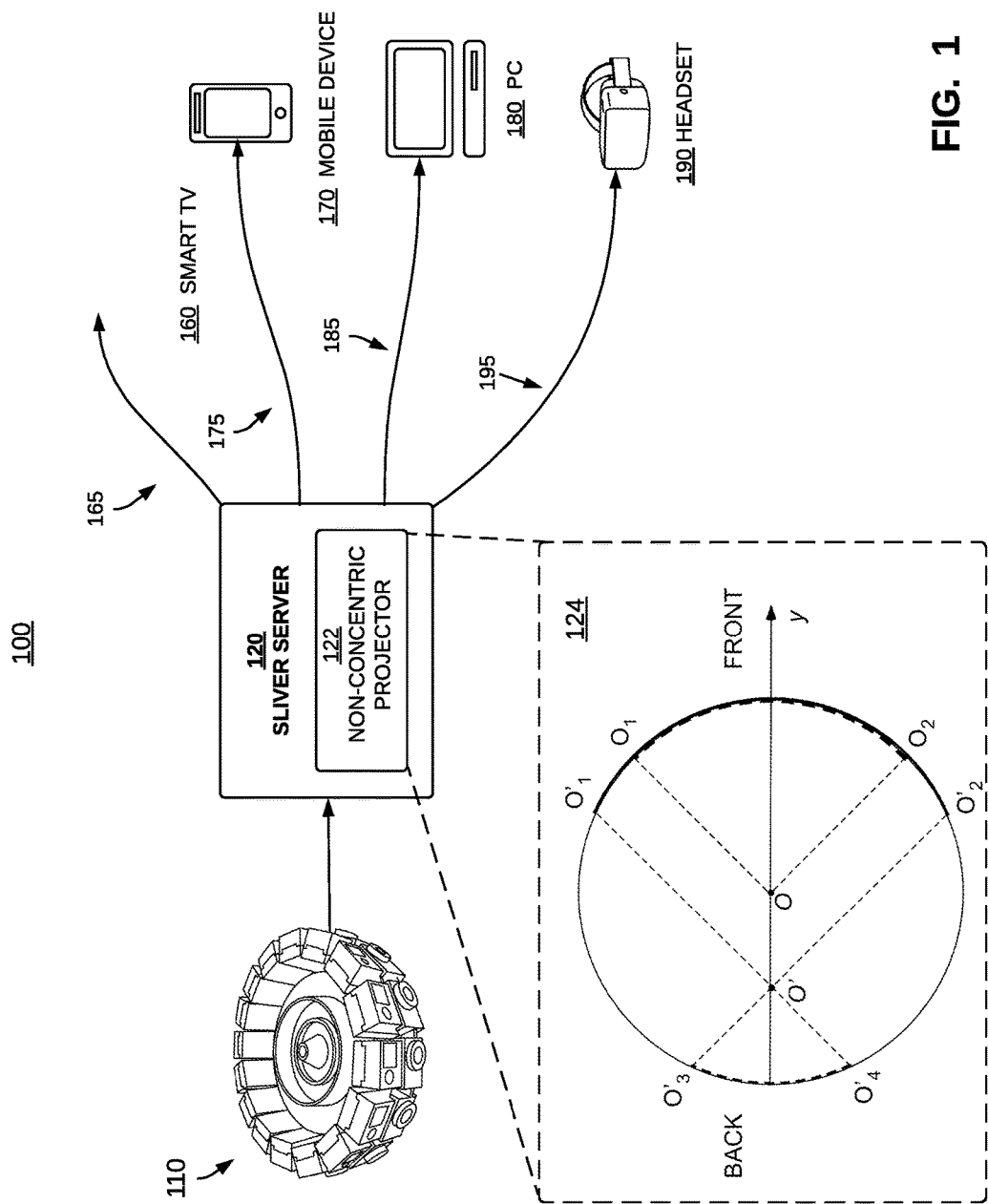
FIG. 1 is an illustrative schematic diagram for spherical video generation for multi-resolution view according to one embodiment of the present invention.

Some illustrative definitions are provided to assist in understanding the present invention, but these definitions are not to be read as restricting the scope of the present invention. The terms may be used in the form of nouns, verbs, or adjectives, within the scope of the definition.

"Spherical video," "360 video," "360-degree spherical video," "3D-360 video" or "immersive video" is a video with a wide horizontal viewing angle up to 360 degrees, and possibly a 180-degree vertical viewing angle. In other words, a spherical video is an immersive video where the view in every direction is available at the same time. A spherical video may be viewed on a dedicated head-mounted display in 360 mode, a surrounding screen such as a dome-shaped display, or in slidable panorama-360 mode on conventional 2D or 3D viewing devices such as personal computers and mobile devices. A spherical video may comprise real video footage captured by physical camera arrays or an omnidirectional camera, computer simulated scenes in the form of virtual reality, or a combination of both, in the form of augmented reality. In the present disclosure, spherical video is discussed mostly in the context of virtual reality video captured during computer game plays. Nonetheless, it would be understood by persons of ordinary skill in the art that physical cameras and virtual cameras are equivalent in the spherical video generation process, and "virtual reality (VR) video" or "augmented reality (AR) video" both describe specific types of 360-degree spherical videos. VR or AR videos may be viewed in full VR mode with a VR headset, or on conventional viewing devices. Playback of spherical videos, including VR and AR videos, may be interactive, with the viewer having control over the viewing directions, and other physical or simulated interactive elements.

"Spherical media" are any visual media with a 360-degree horizontal viewing angle, and may include panoramic images, screenshots, slideshows, and spherical videos.

"Monoscopic" videos contain visual images that do not provide the perception of depth to the viewer. Monoscopic videos are generally captured from the perspective of a single eye.

"Stereoscopic" videos contain offset visual images to provide the illusion of depth perception when shown on a stereoscopic display. Stereoscopic videos are generally captured separately for both left and right eyes. Stereoscopic display devices may present side-by-side images or use autostereoscopy methods or the like to create depth perceptions.

"Panorama-360 mode" or "Slidable panorama-360 mode" is a display mode where spherical media are shown in panoramic form, possibly on a conventional 2D or 3D viewing device. Interactive user control such as cursor movements or screen swipes may be enabled to direct the viewing angle horizontally or vertically.

"3D-360 mode," or "360 mode" is a display mode where spherical media are shown in a fully immersive environment, possibly through a head-mounted display device such as a VR headset. Interactive user control of the viewing angle may be facilitated through head and body movements, and 3D audio may be provided concurrently.

"Spherical Video Broadcast," "Spherical Video Streaming," "Game Broadcast" or "Game Streaming" broadly refer to the constant delivery of spherical media content to one or more end viewers while being provided by the systems disclosed herein. Live-broadcast and live-streaming refer to spherical media content delivery in real-time, for example, as game plays happen. A noticeable time delay in terms of seconds or minutes may be present during a live-broadcast or live-stream.

"Camera array" is a set of one or more cameras configured to capture one or more video recordings that can be combined or stitched together to provide a wide viewing angle, possibly as high as 360 degrees horizontally and 180 degrees vertically, and to generate a spherical image or a spherical video. A camera array may comprise physical cameras for capturing the real world, virtual cameras for capturing a simulated world, or a combination of both physical and virtual cameras. For example, a physical camera array may be used to record live actions of a soccer game, a virtual camera array may be used to capture actions in a video game such as League of Legends, and a combination of both physical and virtual cameras may be used to generate augmented and overlapping displays such as for the located-based AR game Pokémon Go. Each camera within a camera array may face a different direction, and the camera array may be associated with a center point, which may be an exact or approximate intersection of the direction vectors, or may be defined relative to individual imaging planes of the component cameras. A camera array may also be associated with a set of absolute or relative position coordinates to uniquely identify its location within the immersive environment being captured. In addition, each camera within a camera array may be characterized in terms of its orientation, viewing angle and focal length, zoom factor, and the like.

"Virtual camera array" is a set of virtual cameras configured in a computer simulated environment such as a video game to capture the virtual world in a wide viewing angle, up to 360 degrees horizontally and 180 degrees vertically. As a subtype of general cameral arrays, a virtual camera array includes one or more virtual cameras, and is associated with an exact or approximate center point. A virtual camera array may be associated with a set of position coordinates to uniquely identify its location within a game universe or game world, and each virtual camera within a virtual camera array may be characterized in terms of orientation, viewing angle and focal length, zoom factor, and the like.

"Capture," "Record," "Receipt," "Retrieval," or "Access" to or of a video recording refers to the saving or storage of the video content in memory, with or without explicit graphical displays on a display device such as a computer screen. In the case of a virtual game world, such actions also refer to the rendering and storage of game graphics data.

"Projection" is a representation of a three-dimensional (3D) spherical view of the real world or of a virtual world on a projection surface, often for digitized view, storage, and processing. Projection surfaces may be planar, flat, and two-dimensional (2D). A forward projection maps an entire sphere or portions of it onto a projection surface, transforming spherical coordinates into planar coordinates, while a reverse projection transforms from the projection surface back onto the sphere. Distortions in angles, shapes, distances and areas may be introduced in the projection process. Projection surfaces may also be contoured and three-dimensional (3D).

"Cubic projection" refers to a projection from or onto flat images arranged like the faces of a cube, and viewed from the cube's center.

"Spherical projection," "Sphere projection" or "Equirectangular projection" refers to a projection from or onto the surface of a sphere, or portion thereof.

"Concentric projection" refers to a projection where the projection center coincides with the center of a three-dimensional projection surface. "Concentric spherical projection" refers to a spherical projection where the projection center is at the center of a projection sphere. In this disclosure, "concentric projection" and "concentric spherical projection" are used interchangeably. It would be understood by persons of ordinary skill in the art that projection operations as disclosed herein may be performed relative to non-spherical projection surfaces such as cubes, rectangles, ellipses, and the like as well. In a concentric spherical projection, the longitude maps directly to horizontal planar coordinates, and the latitude maps directly to vertical planer coordinates, without additional transformation or scaling. In other words, equal resolution or equal number of pixels are assigned to all directions around the projection sphere.

"Non-concentric spherical projection" or "Non-concentric projection" refers to a spherical projection where the projection center does not coincide with the center of a projection sphere. In a non-concentric spherical projection, at least one portion of the sphere is assigned more pixels than others. For example, a frontal direction can have a higher visual resolution than a back direction. Again, "non-concentric projection" and "non-concentric spherical projection" are used interchangeably in this disclosure. It would be understood by persons of ordinary skill in the art that non-concentric projection operations as disclosed herein may be performed relative to non-spherical projection surfaces such as cubes, rectangles, ellipses, and the like as well.

"Non-transitory storage medium," "physical medium," "storage medium," and the like refer to an article of manufacture in which computer program code may be stored, said program code later to be executed by a computing device having access to at least one hardware processor, such as a server, a cloud repository, an end-user device, and so on.

"Interface," "user interface," "graphical user interface (GUI)," and the like is a user interface (UI) in a display of a computer screen, where a user of a computer system can provide input.

"Server" is a computer comprising a processor and a memory that is used by the system to provide the software program code implementing the invention, possibly to multiple client devices over a communications network.

"User" is a person or device that interacts with the SLIVER system as disclosed herein. A user may represent a broadcaster, a participant, or a spectator of the events or actions being recorded. A broadcaster may be a presenter or a commentator to a broadcast. A broadcaster or a participant may stream video recordings in real-time. A participant may be a person or a bot. A spectator observes or watches the events or actions being recorded. A user may be called a viewer to the system. In the context of gaming applications, a user may represent a broadcaster, a player, or a spectator to a game. A player participates in game actions, and may be a real person or a bot. A game spectator observes or watches game plays unfold, often with special access to player and game information.

"User-device", "end-user device", "mobile device," and the like refer to a computer with a display, input options, a processor and a memory, often in the form of a laptop, desktop, tablet, smartphone, or the like, that is used by users of the SLIVER system to interact with and access the services of the present invention.

"Client-server connection", "communications link", and the like is a connection between a sever and a user-device via a communications network.

"Algorithm" is a set of instructions to be followed in calculations or processing, especially by a computing device. In a computer implemented method or system, the term algorithm may be used interchangeably with the terms "rules" or "instructions," to refer to a sequence of steps to be carried out by a computer processor following instructions encoded in memory. An algorithm can be encoded in program code stored on a physical storage medium.

"One embodiment" or "an embodiment" means that a particular feature, structure, or characteristic described in connection with the embodiment is included in at least one embodiment of the invention. The appearance of the phrase "in one embodiment" in various places in the specification is not necessarily all referring to the same embodiment, nor is a separate or alternative embodiment mutually exclusive of other embodiments. Various features are described which may be exhibited by some embodiments and not others.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Broadly, embodiments of the present invention relate to immersive media content generation, and pertain particularly to methods and systems for spherical video generation for streaming, highlight, and replay in an immersive environment, including virtual reality (VR) and augmented reality (AR) environments. More specially, embodiments of the present invention relate to capturing the entire scene around a camera or a camera array, and performing non-concentric spherical projections on the captured video recordings to generate output videos for live-broadcast and replay. Such output videos may be reverse projected by a viewer client to recreate the 360 spherical environment.

By performing non-concentric spherical projections, embodiments of the present invention allow one or more selected directions to be viewed under higher resolutions, thus providing better clarity or visual fidelity for more important portions of the virtual environment, while minimizing data storage and transfer overheads. Camera array positioning and selection further allow transition among different viewpoints to maintain high-resolution views of important events or actions of interest.

For example, in video gaming applications, live game plays of VR or non-VR games can be captured using a virtual camera array, and processed accordingly using non-concentric spherical projections to generate spherical videos. Unlike conventional game screencasts where a viewer sees only one competing player's field of view or a limited third-person view, spherical video recordings of the game play allows users to fully immerse in the game environment and see what is happening not only around players' positions but also throughout the entire game universe, in real-time or in an off-line fashion. More importantly, over 90 percent of the time, a player or a viewer faces and watches the frontal direction where most gaming actions occur, instead of the back or a side direction which correspond mostly to static scenes. Embodiments of the present invention leverages on such observations to optimize memory and bandwidth usage without compromising the user experience. In various embodiments of the present invention, multi-resolution capturing and/or down-sampling techniques may also be utilized to render and project different portions of the VR environment with different resolutions and/or framerates, or spatial and/or temporal frequencies.

More specifically, from a computing perspective, one advantage of the present invention is to provide high-quality immersive media content for live-streaming and replay with minimal data transmission overheads, minimal modifications and minimal performance impacts on existing video capture, storage, and distribution systems, in real-time or in an off-line fashion. Systems as disclosed herein can deliver a better immersive experience with the same bandwidth, by using multi-resolution image and video processing at back-end servers that focus on dynamic events or actions while still providing adequate depictions of surrounding environments.

In gaming applications, embodiments of the present invention provide a turnkey solution that enable not only individual gamers, but also tournament and league operators to run full 360 virtual reality live streams of non-VR and VR games including, but not limited to, Counter Strike: Global Offensive (CS:GO), League of Legends (LoL), and Dota2. Systems and methods thus disclosed also enable on-site production services including secure integration with tournament game servers, real-time 360 capture and live replay rendering through dedicated GPUs, VR streaming and content delivery, end-user eSports viewer apps across all desktop, mobile and VR platforms, and post-event tournament highlights and videos on-demand (VOD).

SLIVER.TV is a trademark name carrying embodiments of the present invention, and hence, the aforementioned trademark name may be interchangeably used in the specification and drawing to refer to the products/services offered by embodiments of the present invention. The terms SLIVER.TV and SLIVER may be used interchangeably in this specification to describe the overall immersive media recording, processing, replaying and streaming platform, the technology behind the platform, as well as the company providing said platform, as the context may require. With reference to the figures, embodiments of the present invention are now described in detail.

System Architecture

FIG. 1 is an illustrative schematic diagram for spherical video generation for multi-resolution view according to one embodiment of the present invention. A camera array 110 is a set of one or more cameras configured to capture one or more video recordings of a surrounding scene or environment. Such video recordings may be transmitted to SLIVER system or server 120, where they are combined or stitched together to provide a wide viewing angle, and undergo appropriate projections to generate a spherical video. As previously defined, a spherical video has a wide horizontal viewing angle up to 360 degrees, and a vertical viewing angle up to 180 degrees. The spherical video may be transmitted or delivered to user devices such as a dedicated headset 190, or conventional viewing devices such as personal computer 180, mobile device 170, or smart TV 160. In various embodiments of the present invention, non-concentric projection as disclosed herein is conducted at SLIVER server 120. For example, a non-concentric projector 122 may be implemented as an encapsulated module to generate non-concentric spherical videos with multi-resolution views.

For illustrative purposes only, a schematic representation 124 is provided in FIG. 1 to demonstrate the non-concentric spherical projection principal in two-dimensional space.

When the image of an object is to be mapped onto a projection circle with center O as shown, the object may be placed either concentrically with the projection circle, at location O, or non-concentrically with the projection circle, at location O', which is a non-zero distance away from the center O. With a concentric projection, the size of projected arcs on the projection circle is the same in both the front and back directions, as measured between points $O_1$ and $O_2$ in FIG. 1. With a non-concentric projection, the sizes of projected arcs on the projection circle are different, as measured between points $O'_1$ and $O'_2$ in the front direction, and between points $O'_3$ and $O'_4$ in the back direction. As the offset distance between O' and O increases, the difference in the projected arc sizes increases as well. Assuming imaging pixels are positioned uniformly around the projection circle. The projected arc sizes may be viewed as indicative of a number of pixel representation assigned to the projection of the object. Thus, with the non-concentric projection setup, more pixels are assigned to the front than to the back in schematic 124, leading to a multi-resolution view of the projected image.

The term "multi-resolution" is used throughout the present disclosure to refer to variations in spatial visual perception achieved using non-concentric spherical projection. Multi-resolution view of a non-concentric spherical video allows a portion of a video frame to have better visual clarity and higher visual resolution than some other portion of the same video frame. Such a multi-resolution effect may be achieved by allocating more pixels to the high-resolution portion than the low resolution portions. For example, a frontal direction with a 120-degree horizontal field of view or field of vision (FOV) may be allocated more pixels than a back direction, also with a 120-degree horizontal FOV. In some embodiments, such variations in spatial resolution may be gradual, progressive, or incremental, without an exact boundary line between a high-resolution portion and a low-resolution portion. In some embodiments, such variations in spatial resolution may further change over the temporal domain, as individual video frames may undergo concentric or non-concentric spherical projections with different projection parameters.

Although a circular camera rig 110 is shown in FIG. 1, a camera array may comprise any number of physical or virtual cameras, where each may face a different relative direction, possibly away from a center point for the camera array. In this disclosure, a camera array is also referred to as a "viewpoint," and an exact or approximate center point for the camera array is referred to as a "viewpoint center." Such a center point may be defined in terms of the relative position and orientations of the component cameras and their imaging planes. For example, if component cameras are arranged in the shape of a symmetric, regular polyhedron, or along the edges of a regular polygon, the center point can be defined exactly. If component cameras are arranged in a less symmetric fashion, for example, along a straight line, with each camera facing a slightly different direction to cover the entire surrounding environment, an approximate center point for the camera array may be found, for example by locating a point with a shortest average distance to the component camera's view or imaging planes, or as an exact or approximate intersection point of camera direction vectors, relative to individual imaging planes of the component cameras. In addition, a camera array may be associated with a set of absolute or relative position coordinates to uniquely identify its location. Each camera within a camera array may be further characterized in terms of orientation, viewing angle and focal length, zoom factor, and the like. In some embodiments, a camera array comprises two or more cameras. In some embodiments, a camera array comprises at least one virtual camera. In some embodiments, a camera array as disclosed herein may comprise a single omnidirectional camera with a large visual field that covers approximately a hemisphere or the entire visual sphere. In this case, captured light rays do not necessarily intersect exactly in a single focal point, yet a center point may be defined, and a non-spherical projection may be performed on recordings by the omnidirectional camera, for multi-resolution views of different portions of the recording.

In various embodiments, SLIVER server 120 may distribute generated spherical videos to one or more user devices for viewing. Such spherical videos may be monoscopic or stereoscopic, and may be downloaded to user devices for live viewing or on-demand replay through a view client application installed therein. Exemplary user devices include smart TVs such as 160, mobile devices such as 170, personal computers such as 180, headsets such as 190, and the like. A mobile device may be a laptop computer, a tablet, a smartphone, or wearable devices such as a watch or smart glasses. A headset may be a head-mounted device capable of recording user head and body movements for interactions with the immersive environment. Exemplary headsets include, but are not limited to, dedicated high-end headset such as Oculus Rift, Sony PlayStation VR, Magic Leap One, and low-end devices such as Google Cardboard or Daydream or Samsung Gear VR, which may be used concurrently with a smartphone to view an immersive environment. In addition, a headset for immersive experience may be used with a motion platform or seat, possibly with an immersion simulator. Communication links such as 165, 175, 185, and 195 may be wireless or wired, and may employ technologies and protocols comprising Ethernet technology, Local Area network (LAN), Wide Area Network (WAN), optical network, and the like.

In various embodiments of the present invention, a spherical video generated using non-concentric spherical projection may comprise real world video footages, computer simulated scenes, or a combination of both. In what follows, spherical video is discussed mostly in the context of virtual reality video captured during computer video game plays. Nonetheless, it would be understood by persons of ordinary skill in the art that physical cameras and virtual cameras are equivalent in the spherical video generation process, and "virtual reality video" or "augmented reality video" both describe specific types of 360-degree spherical videos. In what follows, exemplary system architectures of the SLIVER server discussed in the context of computer video gaming applications are provided for illustrative purpose only, and do not limit the scope of the present invention.

Computer Video Gaming Applications

Figure 2:
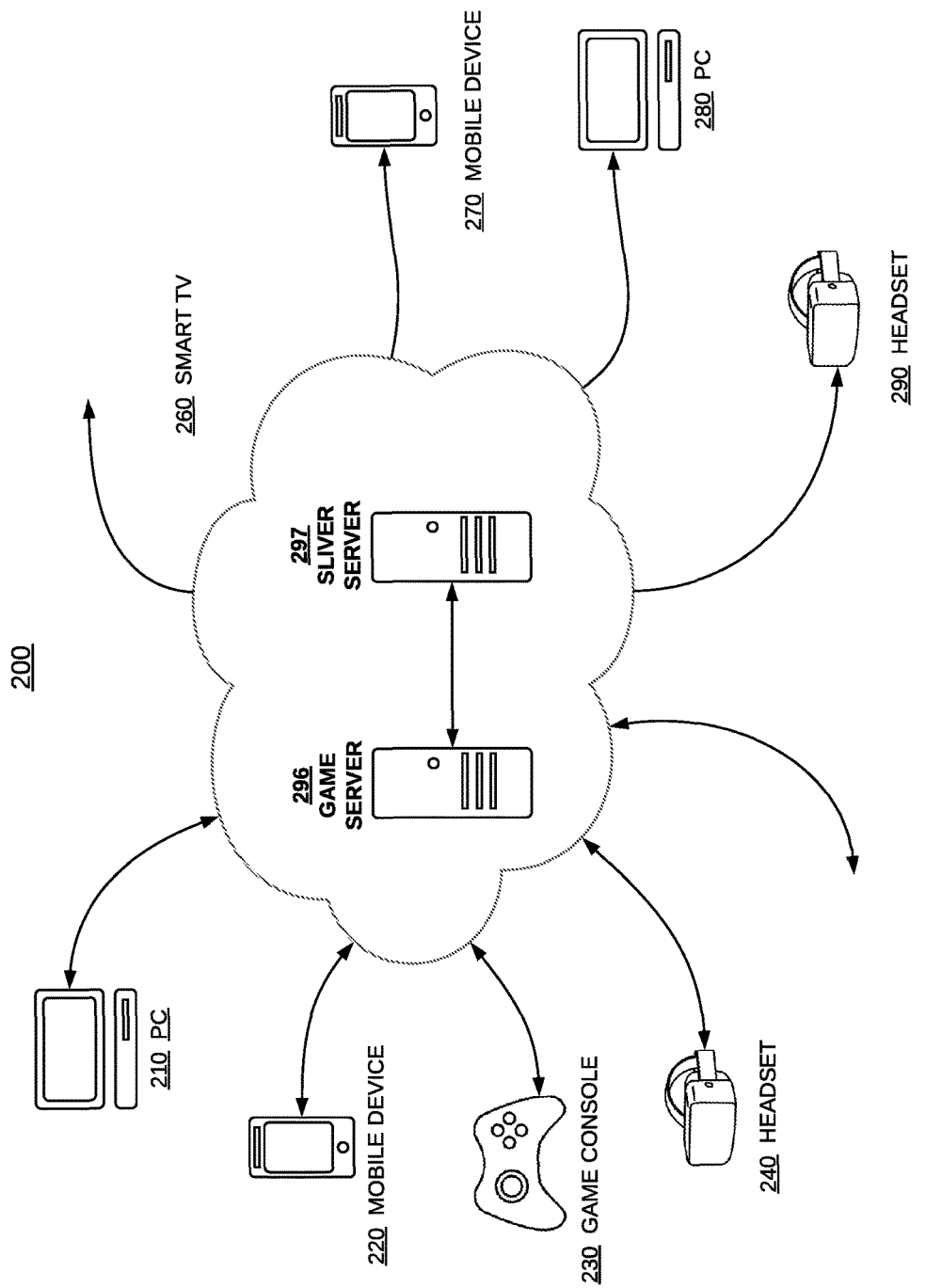
FIG. 2 is a network configuration diagram in which the present invention may be practiced, according to one embodiment of the present invention.

FIG. 2 shows a schematic diagram of a network configuration 200 for practicing one embodiment of the present invention in gaming applications. One or more user devices may be connected to a SLIVER server 297 and/or a game server 296 through network links to facilitate a source game play of a source computer game running on game server 296. One or more virtual camera arrays similar to camera array 110 may be deployed within game server 296 to capture game video recordings. Game data such as visual and non-visual recordings of the source game play, rendered game scenes or textures, metadata, and the like, may be sent by game server 296 to SLIVER server 297, while information such as virtual camera control and timing control data may be received by game server 296 from SLIVER server 297, for virtual camera configuration and game video generation. SLIVER server 297 generates spherical game videos from game recordings captured by the virtual camera arrays, using spherical or non-spherical projections.

In some embodiments, user devices may be operated by users such as observing game spectators, or game players and broadcasters who stream or commentate game playthroughs and highlights for broadcasting over the SLIVER platform. In various embodiments, user devices may be a personal computer 210 or 280, a mobile device 220 or 270, a game console 230, a headset 240 or 290, a smart TV 250 or 260, or the like.

In some embodiments, virtual camera arrays used for capturing the game universe may be inserted into the source game using a Software Development Kit (SDK) or a game connector module. In the present disclosure, a source computer game refers to a mobile, desktop, or console game that either lacks spherical video output or is an existing VR game. Copies of a source computer game may be installed in individual user devices, in conventional game servers such as server 296, or in a SLIVER server such as 297.

In some embodiments, SLIVER server 297 is called a processing server, and game server 296 may be an eSports tournament server. SLIVER server 297 is a platform for processing game data including metadata and/or game play recordings produced from source game plays of source computer games. It may conduct a plethora of functionalities such as virtual camera control, game environment and game play capture, game map analysis and game map data processing, highlight video generation, spherical media generation and streaming, and the like.

In some embodiments, SLIVER Server 297 is a distributed system, where constituent controller, algorithmic components and modules, graphical processing units, and media storage and streaming services are implemented on physically or logically separate devices. In some embodiments, SLIVER Server 297 is hosted in the cloud. In some embodiments, SLIVER Server 297 is a dedicated server having access to a dedicated local area network connection to game server 296, where game data or video recordings are received through the dedicated local area connection from game server 296. For eSports tournaments, SLIVER server 297 may be located on-site, in close proximity to the tournament hosting server 296, where data transmission latency between the two servers is further reduced, and where SLIVER server 297 may have access to game data not generally available to players, broadcasters, or regular spectators. In some embodiments, during a professional competition, a game play viewed through spectator mode may be delayed by a certain amount of time to prevent competing teams from gaining any competitive advantages over each other. SLIVER server 297 may take advantage of such delays to deploy additional virtual cameras and/or to create game highlight videos that may be instantly replayed, or may be perceived as real-time replays.

In some embodiments, immersive media content such as game video produced by SLIVER server 297 is spherical. Such spherical data, once streamed to user devices or user clients, may be reverse projected to provide a multiple-resolution view of actions within the VR game environment. A multi-resolution view of virtual game world allows better clarity or higher visual fidelity in directions of more importance, for example, the frontal direction in a first-person shooting game, or the hoop direction in a real-world basketball game.

Figure 3:
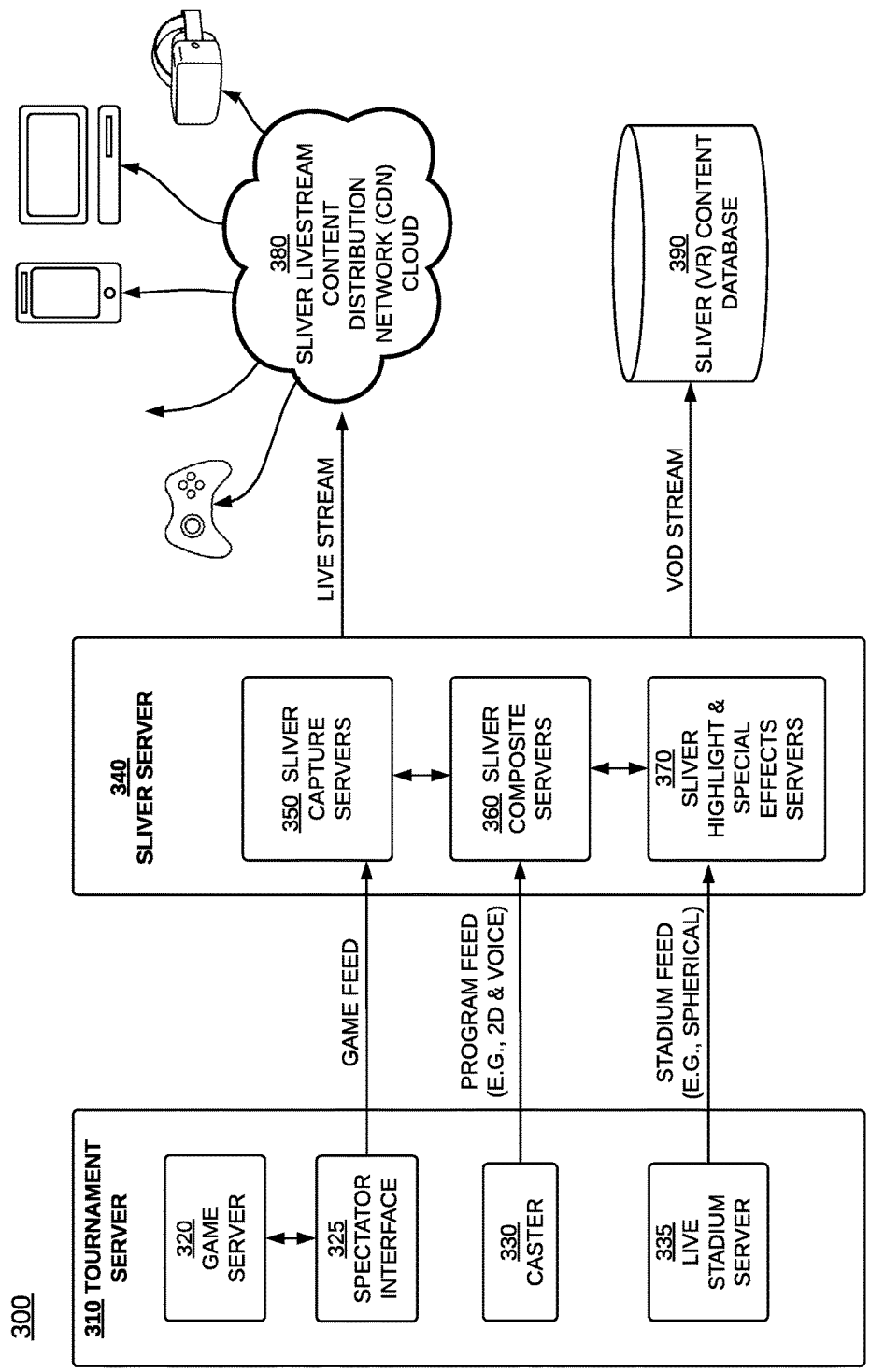
FIG. 3 is an architectural overview of a game video VR live cast and replay framework, according to one embodiment of the present invention.

FIG. 3 is an architectural overview of a game video live cast and replay framework 200, according to one embodiment of the present invention. In this embodiment, a tournament server 310 provides game feed, program feed, and optionally stadium feed to a SLIVER server 340, which in turn provides media content, either as live streams to a SLIVER livestream content distribution network (CDN) 380, or as video-on-demand to a SLIVER content database 390. Such media content may be audio, video, in 2D, 3D, or spherical media formats, and may comprise game video screencasts, game moment highlights, broadcast commentaries, and the like.

In some embodiments, tournament server 310 may comprise one or more dedicated game servers such as game server 320, interconnected with a spectator interface 325, a caster 330, and a live stadium server 335. Although only a single interconnection is shown in FIG. 3, each module, component, or server within tournament server 310 may be interconnected to produce the game feed, program feed, and stadium feed as shown.

A game server such as 320 is a local or remote server for hosting a single-player or multiplayer video game over a data network or multiple interconnected data networks. A game server is the authoritative source of events in the computer game; it may render the game world in real time, may receive and process player data, and may also transmit game play data to allow connected game clients to maintain their own versions of the game world for display. In some embodiments, the term "game server" may be used to refer to a more general tournament or eSport server, such as tournament server 310, comprising additional modules or components to support competitive gaming broadcast, streaming, and processing.

For optional viewing experiences, spectator interface 325 may provide dedicated and specialized observing features that give spectators access to information that even the players may not have. For example, players may be provided with a player interface overlay on screen, which may comprise one or more of a minimap, a game time panel, a score panel, a team information panel, a chat panel, or other similar information boxes or annotations. Spectator interface 325 may also add spectator overlays. For example, spectator interface 325 may modify the minimap so spectators can view movements of players from both teams instead of a player's own team.

Caster 330 facilities actions by broadcasters and provides the program feed to SLIVER server 340. A broadcaster may be a person or a software engine based on artificial intelligence. A broadcaster may alternatively take on the role of a camera man in regular sports, manipulating virtual cameras within the source game to make sure spectators understand events occurring in the game play. Such "camera work" is crucial to the production of a great tournament event. In some embodiments, caster 330 may be modified to allow virtual camera control configurations by SLIVER server 340, enabling new, novel, or easily overlooked or omitted viewing perspectives to be used for game play capture, and enabling optimized game video production for visual fidelity and resource efficiency.

Live stadium server 335, as the name implies, may capture and process actions or reactions from a spectating crowd. Such stadium feed provided to SLIVER server 340 may be further processed and spliced into tournament videos for showing on the stadium screen, or for streaming to remote spectators.

Through the game feed from spectator interface 325, SLIVER server 340 may have full access to recordings and data of the game play, including video or game data feeds from any number of or all virtual camera arrays within the game world, player interface data as shown to individual players, spectator interface data as broadcasted, as well as other game play data compilations, in the form of one or more merged video screencast streams, or in multiple data streams that can be analyzed or processed separately. SLIVER server 340 may use such data to identify event and action locations within a game map, determine optimal viewing perspectives, directions, or angles, and classify on-screen and off-screen critical gaming moments, thus enabling viewers to have clear view and full access to all important events occurred or occurring in a game play. In addition, SLIVER server 340 may configure virtual camera arrays to capture at different spatial and/or temporal resolutions, and perform non-concentric spherical projections to generate spherical videos that represent different portions with different resolutions.

Moreover, in some embodiments such as shown in FIG. 3, SLIVER server 340 may comprise one or more capture servers 350, one or more composite servers 360, and one or more highlight and special effects servers 370. Capture server 350 may use one or more dedicated Graphical Processing Units (GPUs) to capture game video recordings from the game feed, to render portions of a local game play, possibly in 360 degrees, and to capture game environment and game players together or separately for spherical video generation, with or without non-concentric spherical projections for multi-resolution viewing. Composite server 360 may combine multiple video segments or multiple video streams and corresponding game metadata to generate game videos for streaming and replay. For example, a composite server may generate picture-in-picture displays of 2D broadcasts superimposed on 360 spherical media, according to embodiments discussed in priority applications U.S. Pat. Nos. 9,573,062 and 9,473,758, issued to the same inventors as this application. Highlight and special effect servers 370 may utilize machine learning and/or machine vision algorithms to auto-detect particular game events, scenes or moments of interest, and generate highlight videos, with or without highlight effects such as slow-motion or close-up with fly-by camera angles. Such highlight videos may be broadcasted or streamed on its own, may be spliced back into a live stream, or may be made available to tournament and league operators to incorporate into existing broadcast to game video streaming and sharing platforms, such as Twitch and YouTube. In various embodiments, stitching of individual video recordings, concentric projections, and/or non-concentric projections may be performed by either server 350, 360, or 370, on the video recordings to generate spherical videos for output. For example, a non-concentric projector such as 122 shown in FIG. 1 may be implemented as an encapsulated module within one of the SLIVER servers, or as an additional projection server.

Figure 4:
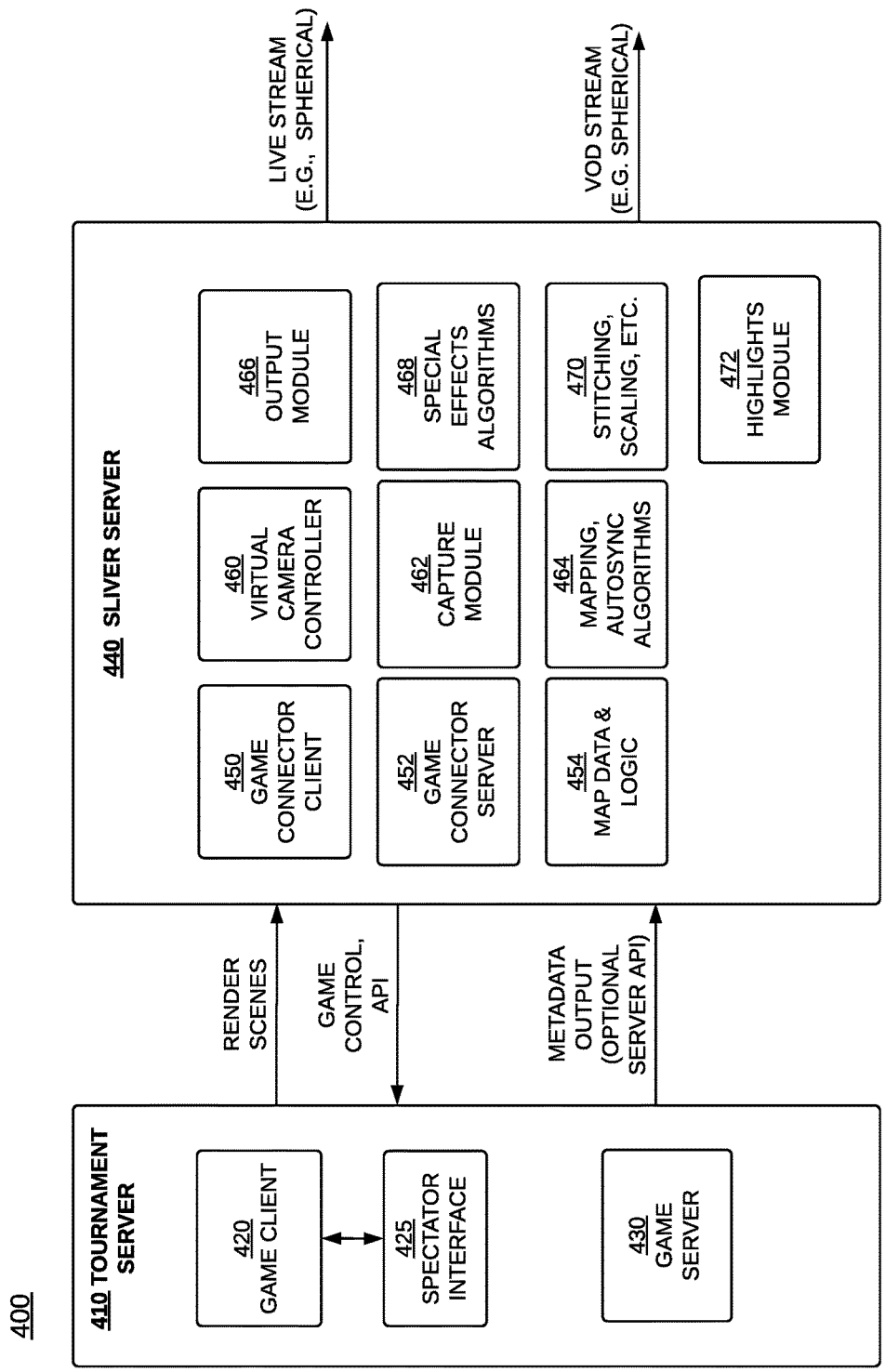
FIG. 4 is a block diagram showing an illustrative architecture of game and system servers for spherical game video generation, according to one embodiment of the present invention.

FIG. 4 is a block diagram showing an illustrative architecture of game and system servers for spherical game video generation and processing, according to another embodiment of the present invention. In this embodiment, a tournament server 410 provides game data such as metadata and rendered scenes to SLIVER server 440, and in turn receives game control information as well as API handles for game or tournament configuration and other functions necessary for running a game play and capturing recordings of the game play. Such game control data may include virtual camera control signals and other game capture configuration parameters.

In various embodiments of the present invention, SLIVER servers 440 may comprise multiple modules, components, or dedicated servers, including, but not limited to, game connector client 450, game connector server 452, game map data and logic analyzer 454, virtual camera controller 460, capture module 462, mapping and auto-syncing algorithms 464, output module 466, special effects algorithms 468, post-processing server 470, and highlights module 472. Post-processing server 470 may perform functions such as stitching, scaling, cubic projection, concentric or non-concentric spherical projections, retouching, blending, and the like. Although not shown explicitly in FIG. 4, each individual module of SLIVER server 440 may be interconnected to other modules to share control and game data, and each individual module may be implemented on physically or logically separate devices.

More specifically, game connector capture client 450 and game connector server 452 may be viewed as a conversion tool, which can transform input visual or non-visual game recordings such as CounterStrike demo files into raw video recordings that may be further analyzed or processed to generate 2D, 3D, or spherical media for live or on-demand streaming.

Map data and logic analyzer 454 may analyze different areas of a game map or minimap, to determine optimal virtual camera locations that are more likely to capture gaming moments with optimal perspectives during a game play, and to determine optimal virtual camera locations for generating high resolution spherical video. In some embodiments, map data and logic analyzer 454 may collaborate with other components such as mapping and autosyncing algorithms 464, capture module 462 and/or highlights module 472 to conduct auto-detection of one or more optimal virtual camera locations even before a game play is initiated, by analyzing map or game data as provided by game developers or tournament operators, or by leveraging computer vision as well as other machine learning algorithms applied to previously recorded game plays or the game environment itself. Such identified virtual camera locations may be considered "pre-determined" relative to the game play, and the identified optional game virtual camera locations may or may not coincide with virtual camera locations within the game map as originally provided by the game developers. In some embodiments, pre-determined locations may refer to user-identified or user configured locations. In yet some embodiments, locations may be considered "pre-determined" relative to particular gaming moments; in other words, any virtual camera inserted, activated, or configured before or when a gaming event or moment takes place, even after initiation of the overall game play, may be considered "pre-determined." In some embodiments, each pre-determined location may be a static location within a game map, a tracking location associated with a game player, a tracking location associated with a game object, a dynamic location that may be controlled by a game broadcaster, or a dynamic location that may be controlled by a spectator. For tracking purposes, a game player may be viewed as a game object as well. In some embodiments, virtual cameras may be inserted into the source computer game at the identified optional virtual camera locations using an SDK such as SLIVER SDK 525 shown in FIG. 5 or a game connector module, such as game connector client 450 and game connector server 452.

Furthermore, in some embodiments, auto-detection or auto-identification of optimal virtual camera locations may be conducted live during a game play, again by leveraging computer vision and/or other machine learning algorithms to determine camera metadata based on extracted visual, audio, and/or game metadata cues, then identifying optimal locations for placement of virtual camera arrays based on the camera metadata. Such optimal camera locations may follow exciting and critical gaming moments or track the movements or actions of a particular player of interest. Such optimal camera locations may broadly refer to static or tracking positions, as well as dynamic virtual camera array trajectories. Each virtual camera array trajectory may be further associated with at least one movement speed function of the trajectory, and one capturing angle function of the trajectory, where a given virtual camera array that moves along a given trajectory may move according to the movement speed function and the capturing angle function.

Virtual camera controller 460 may insert virtual cameras and virtual camera arrays into a source computer game at optimal virtual camera locations, before and/or during a game play, and subsequently activate, control, or configure such virtual cameras or virtual camera arrays as needed. In the present disclosure, a location refers to a point, place, position, or extent in a game space or game world, and may be fixed or anchored relative to other objects, bots, or entities within the game world. Thus, an immovable position associated with a fixed coordinate may be considered a location within the game world; a movable position associated or anchored to a moving player avatar, a moving gadget, or object may also be considered a location within the game world.

Capture module 462 may capture game environment or game plays using virtual cameras or virtual camera arrays that originally existed in the source computer game, or are inserted by SLIVER server 440 before a game play is initiated, or during an active game play. "Capture," "Record," "Receipt," "Retrieval," or "Access" to or of a video recording refers to the saving or storage of the video content, with or without explicit graphical displays on a display device such as a computer screen. In the case of a virtual game world, such actions also refer to the rendering and storage of game graphics data.

Mapping and auto-syncing algorithms 464 may analyze the program feed in real-time, apply computer vision or other machine learning algorithms to determine the location of the current or the first point-of-view player, and identify one or more best or optimal locations of virtual cameras or virtual camera arrays to capture actions in and around this player. Similarly, in some embodiments, mapping and auto-syncing algorithms 464 may be configured to determine the location of players not shown on screen, and identify optimal virtual camera locations in and around such off-screen players.

Output module 466 may function similar to composite server 360 in combining game feed, program feed, stadium feed, post-processed game recordings, and generated game highlights into one or more output data stream, for live or on-demand streaming.

Special effects algorithms 468, post-processing server 470, and highlight module 472 may collaborate in a highlight video generation process and function similar to SLIVER highlight & special effects servers 370 shown in FIG. 3.

Figure 5:
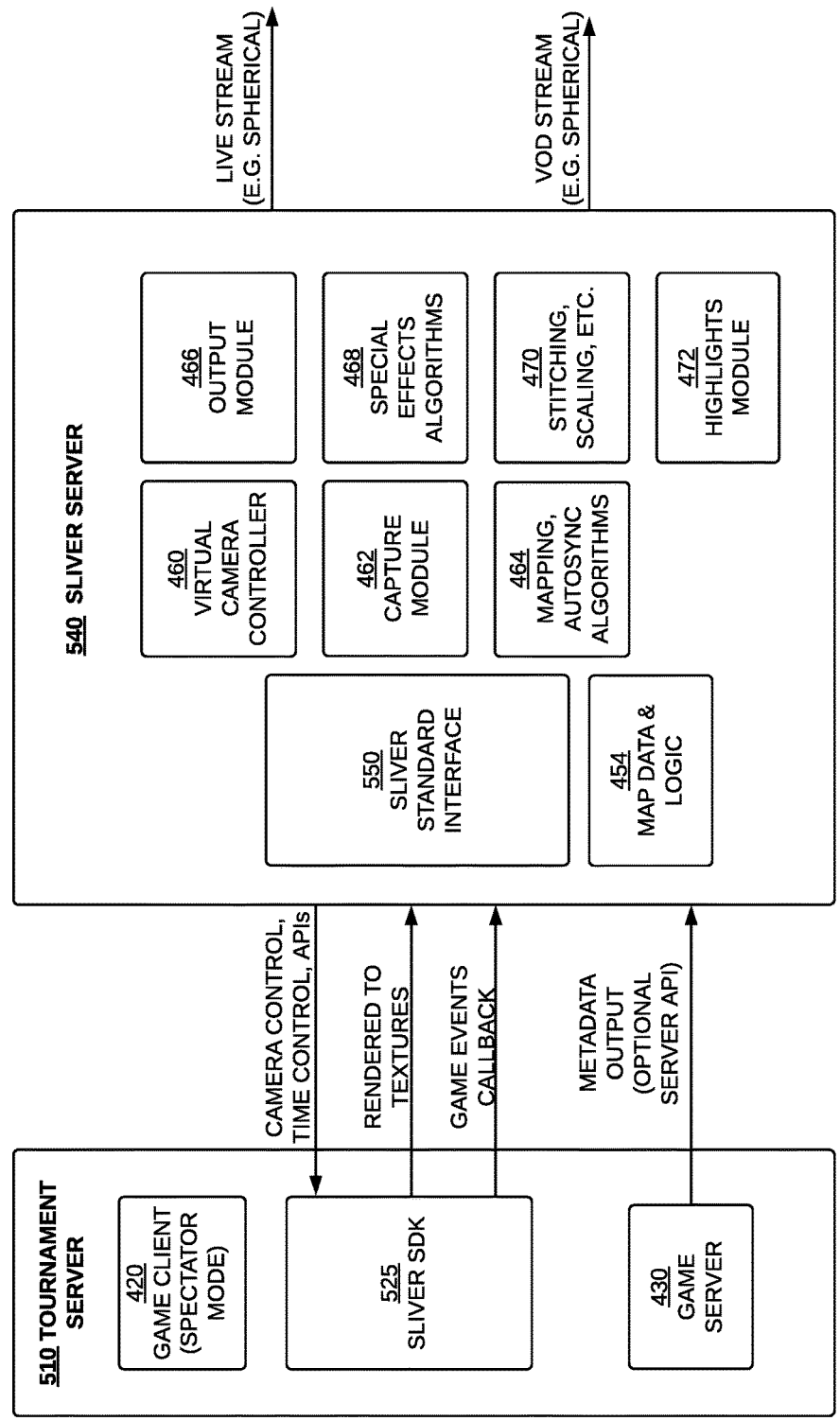
FIG. 5 is another block diagram showing an illustrative architecture of game and system servers using integrated Software Development Kits (SDKs), according to another embodiment of the present invention.

FIG. 5 is another block diagram showing an illustrative architecture 500 of a game tournament server 510 and a SLIVER server 540 for game video generation and processing, using integrated Software Development Kits (SDKs), according to another embodiment of the present invention. In this embodiment, SLIVER server 540 comprises multiple modules, components, or dedicated servers, including, but not limited to, SLIVER standard interface 550, a game map data and logic analyzer 454, virtual camera controller 460, capture module 462, mapping and auto-syncing algorithms 464, output module 466, special effects algorithms 468, post-processing server 470, and highlight module 472. Again, each individual module of SLIVER server 540 may be interconnected to other modules to share control and game data, and each individual module may be implemented on physically or logically separate devices.

Tournament server 510 comprises a game client 420, a SLIVER SDK 525, and a game server 430. Game client 420 may be configured into a spectator mode to provide functionalities similar to those performed by spectator interface 325, caster 330, and live stadium server 335 shown in FIG. 3. SLIVER SDK 525 is integrated into tournament server 510 to interface with SLIVER server 540 and may be used to insert virtual cameras or virtual camera arrays into the source computer game, while also collaborating with SLIVER server 540 through SLIVER standard interface 550 to control such virtual cameras for game video capture. For example, SLIVER SDK 525 may receive camera control data, time control data, or API handles for game or tournament configuration and other functions necessary for capturing recordings of the game play. SLIVER SDK 525 may also provide rendered textures and game event callbacks to SLIVER server 540.

A SDK is a set of software development tools or programming packages for creating applications for a specific platform. An SDK may be compiled as part of the developed application to provide dedicated interfaces and functionalities. Alternatively, an SDK may be an individually compiled module, incorporable into an existing game on a user device as a plug-in, add-on, or extension in order to add specific features to the game without accessing its source code. Thus, an SDK-based capture module may be integrated into existing 2D, 3D or VR mobile, desktop, and console games during the game development stage; alternatively, an SDK-based capture module may be individually compiled and incorporable into an existing game. The capture module may utilize one or more configurable virtual cameras or virtual camera arrays capable of recording a game from various directions or perspectives during real-time game play. Video thus recorded are either monoscopic or stereoscopic, with possible view synthesis through the SLIVER server later. An SDK-based capture module may be able to record from multiple perspectives within the game universe in real-time without significantly compromising the frame rate of the source game play on a user device. For example, capture performance may be optimized by recording at multiple resolutions and/or multiple frame rates, or multiple spatial and/or temporal frequencies, while video post-processing may be performed on the SLIVER server to down-sample, interpolate, combine, stich, and project, to efficiently generate multi-resolution recordings.

Figure 6:
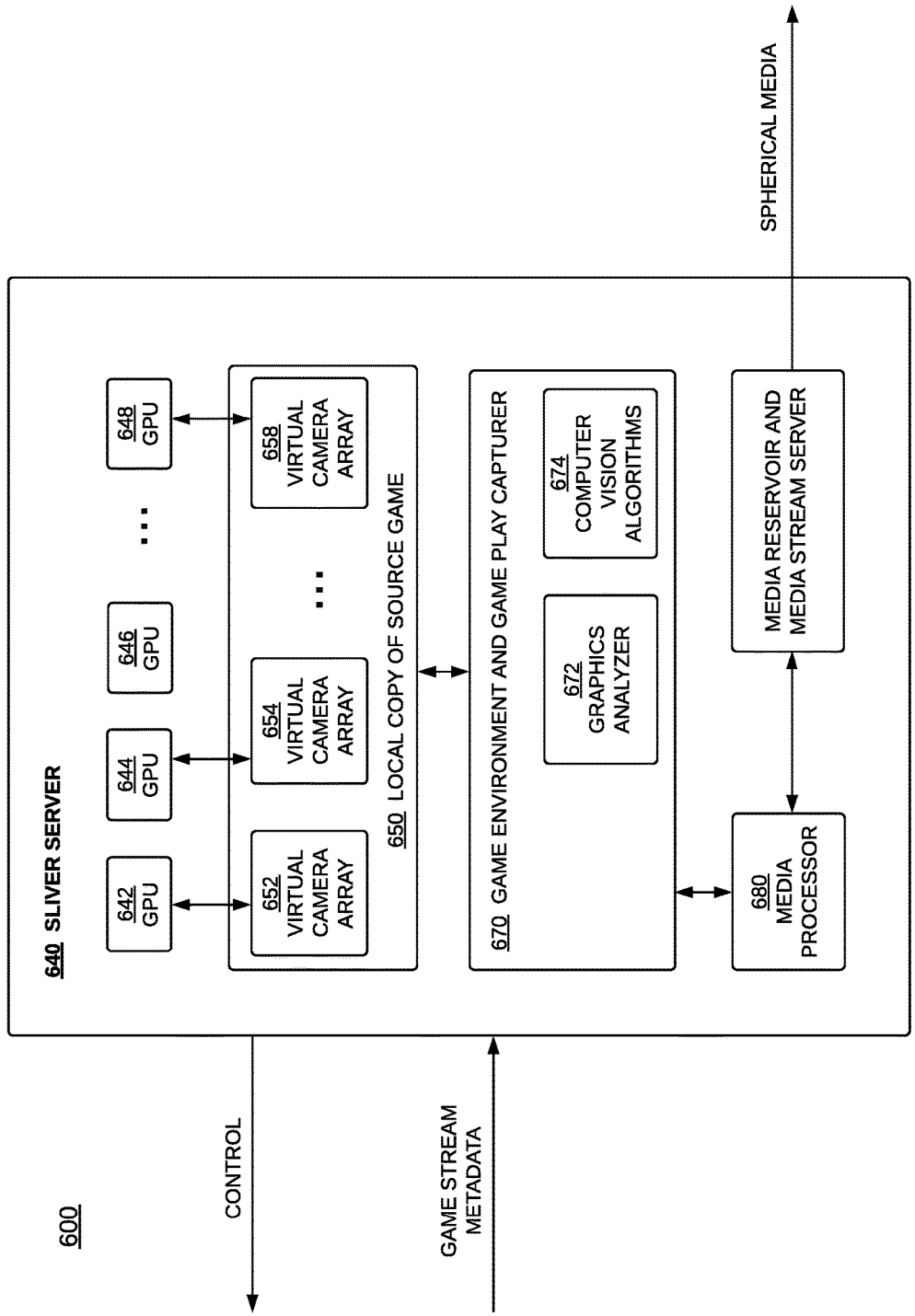
FIG. 6 is another block diagram of a server for spherical game video generation, according to another embodiment of the present invention.

FIG. 6 shows an illustrative block diagram 600 for spherical game video generation, where a local game play is generated from received game metadata, according to one embodiment of the present invention. SLIVER server 640 may host one or more local copies of source games, and employ a game environment and game play capturer 670 to control one or more virtual camera arrays 652, 654, and 658 embedded in a local copy 650 of the source computer game. Server 640 may employ one or more physical or logical GPUs to process visual data captured by individual virtual camera arrays to generate concentric or non-concentric spherical videos for output. In this particular example, GPUs 642, 644, and 648 correspond in a one-to-one relationship to virtual camera arrays 652, 654, and 658, thus game environment and game plays captured by different virtual camera arrays may be handled concurrently by individual GPUs, and shots from more than one virtual camera arrays may be made available for streaming to multiple users. Game videos thus captured may be processed by graphics analyzer 672 and computer vision algorithms 674 to determine optimal virtual camera locations.

The exemplary embodiments of the SLIVER system discussed so far provide a comprehensive platform for video capture, analysis, processing, and distribution, for immersive spherical media generation using non-concentric projections. In the context of gaming applications, the SLIVER system also provides an interface to existing non-VR and VR games. In what follows, more details on the non-concentric spherical projection process are provided.

Non-Concentric Spherical Projection

As previously discussed, a spherical video or immersive video is a video with a wide horizontal viewing angle up to 360 degrees, and possibly a 180-degree vertical viewing angle. In other words, a spherical video is an immersive video where the view in every direction is available at the same time. A spherical video may be viewed on a dedicated head-mounted display in 360 mode, a surrounding screen such as a dome-shaped display, or in slidable panorama-360 mode on conventional 2D or 3D viewing devices such as personal computers and mobile devices. A spherical video may comprise real video footage, computer simulated scenes, or a combination of both. Playback of spherical videos, including VR and AR videos, may be interactive, with the viewer having control over the viewing directions, and other physical or simulated interactive elements. Similarly, spherical media are any visual media with a 360-degree horizontal viewing angle, and may include panoramic images, screenshots, slideshows, and spherical videos. A spherical video may be monoscopic or stereoscopic.

Conventionally, 360 images and videos are generated with concentric spherical projections. One example of a concentric spherical projection is equirectangular projection. The typical workflow of generating a 360 image of the real world is to use a camera array to capture the cubic environment, and map it to a sphere with equirectangular projection. Similarly, for a virtual gaming environment, cubic views or a cubic environment may be rendered or recorded to include six directions: front, back, top, bottom, left and right, before a concentric spherical projection process is performed.

A projection is a representation of a three-dimensional (3D) view of an object or of the real world onto a projection surface, often for digitized view, storage, and processing. A projection may also be of a virtual world onto a projection surface. Projection surfaces may be planar, flat, and two-dimensional (2D). A forward projection may map an entire sphere or portions of it, representative of the real world, onto a projection surface, transforming spherical coordinates into planar coordinates, while a reverse projection may transform from the projection surface back onto the sphere. Distortions in angles, shapes, distances and areas may be introduced in the projection process. Projection surfaces may also be contoured in three-dimensional (3D) space. Cubic projection refers to a projection from or onto flat images arranged like the faces of a cube and viewed from the cube's center. Spherical projection or equirectangular projection refers to a projection from or onto the surface of a sphere, or portions thereof. Generally, the term spherical projection refers to concentric spherical projections, where the longitude maps directly to horizontal planar coordinates, and the latitude maps directly to vertical planer coordinates, without additional transformation or scaling. In other words, equal resolution or equal number of pixels are assigned to front and back directions. However, it is very common for a video recording to have spatial portions that are more important or interesting than other portions. For example, in game VR livestream, exciting actions typically happen in a frontal direction relative to a player, and the back direction is likely to be relatively static in comparison. Hence, applying equirectangular projection to a spherical video such as a VR game livestream may not be very efficient in terms of data storage and transfer bandwidth efficiency. In this example, a better strategy is to tradeoff visual clarity in different spatial portions, allocate more pixels to a more "important" direction such as the frontal direction, so that a better livestreaming experience may be delivered with the same bandwidth. Non-concentric spherical projection achieves such multi-resolution effects, where at least one portion of the projection sphere is assigned more pixels than others during the projection process.

Figure 7:
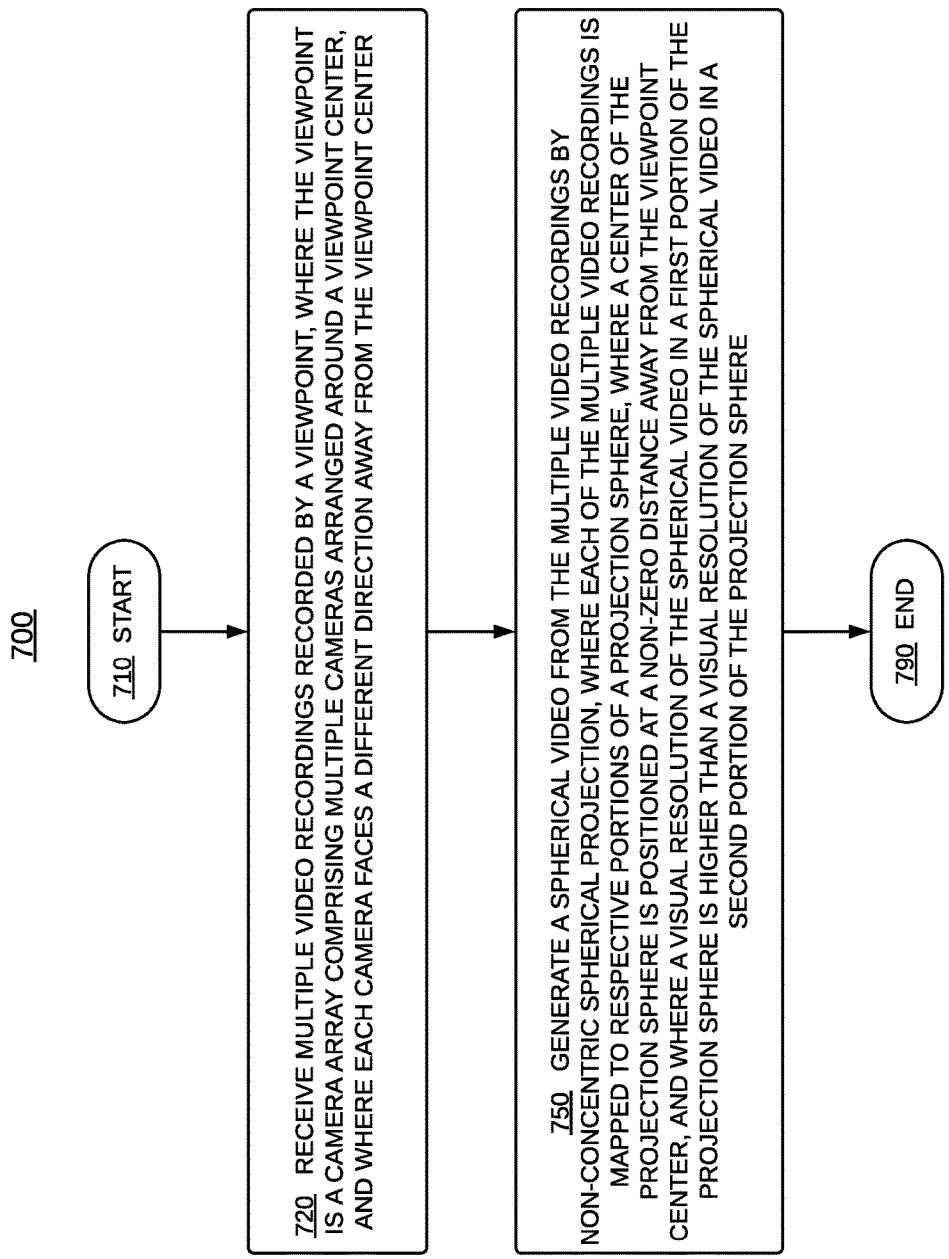
FIG. 7 is an illustrative flow diagram for spherical video generation using non-concentric spherical projection, according to one embodiment of the present invention.

FIG. 7 is a flow diagram 700 illustrating individual steps in an exemplary process for generating non-concentric spherical videos, according to one embodiment of the present invention. Specifically, upon initiation at step 710, multiple video recordings recorded by a viewpoint are received or retrieved at step 720, where the viewpoint is a camera array comprising multiple cameras arranged around a viewpoint center, and where each camera faces a different direction away from the viewpoint center. In computer video gaming applications, the viewpoint camera array may be a virtual camera array or a combination of physical and virtual cameras, for capturing a source game play of a source computer game. The virtual cameras may be inserted into the source computer game using a Software Development Kit (SDK) or a game connector module At step 750, a spherical video is generated from the video recordings by non-concentric spherical projection, where each of the video recordings is mapped to respective portions of a projection sphere, where a center of the projection sphere is positioned at a non-zero distance away from the viewpoint center, and where a visual resolution of the spherical video in a first portion of the projection sphere is higher than a visual resolution of the spherical video in a second portion of the projection sphere. The projection process terminates at step 790.

The non-concentric spherical projection as disclosed herein may be performed on each frame of the received video recordings to generate the spherical video. In some embodiments, each frame of the spherical video may be a flattened 2D image. In various embodiments, the projection process may be performed in real-time, off-line, or in batch mode with some time delays determined by frame rate and size, and processing power. The spherical video may subsequently be provided by a server or engine to user devices and clients, which may in turn perform another projection in the reverse direction to display certain portions of the original immersive environment.

In some embodiments, each of the input video recordings is captured at the same spatial frequency. In some embodiments, one or more of the input video recordings are down-sampled at the same or different down-sampling rates, before non-concentric spherical projection is performed. As shall be discussed with reference to FIGS. 11 to 13, the non-concentric spherical projection process inherently down-samples the input videos, at rates determined by projection parameters. In some embodiments, the input videos are captured at different spatial and/or temporal frequencies. In some embodiments, the input videos comprise six videos to form a cubic environment around a camera array configured in a cubic arrangement, such as the one shown in FIG. 9. On a frame-by-frame basis, cameras within a camera array capture images for different directions, and these images may be sent to a processing module as input for a non-concentric projection process, possibly in real time. The non-concentric projection module may map the input images to a flattened 2D spherical image, where spherical images over individual frames may be collected over time, then compressed to a video stream, such as an x264 mp4 stream, for transmission to cloud storage or a streaming server.

While the non-concentric spherical projection process as disclosed herein provides multi-resolution views of different spatial portions of a spherical video, as events and actions take place, it may be desirable to update the multi-resolution view in the temporal domain as well by updating projection parameters such as the offset distance between the center of a projection sphere and the center of the camera array used for capturing the original input video recordings. The center of the camera array may be viewed as a center of the imaging planes for respective component cameras.

As a video recording progresses, a position of the camera array used to take the video recording may move, for example, within some location ranges or a map. When multiple camera arrays are available within such a map, it is possible to shift among camera arrays to ensure that a current event being recorded always faces a high-resolution "front" direction.

Figure 8:
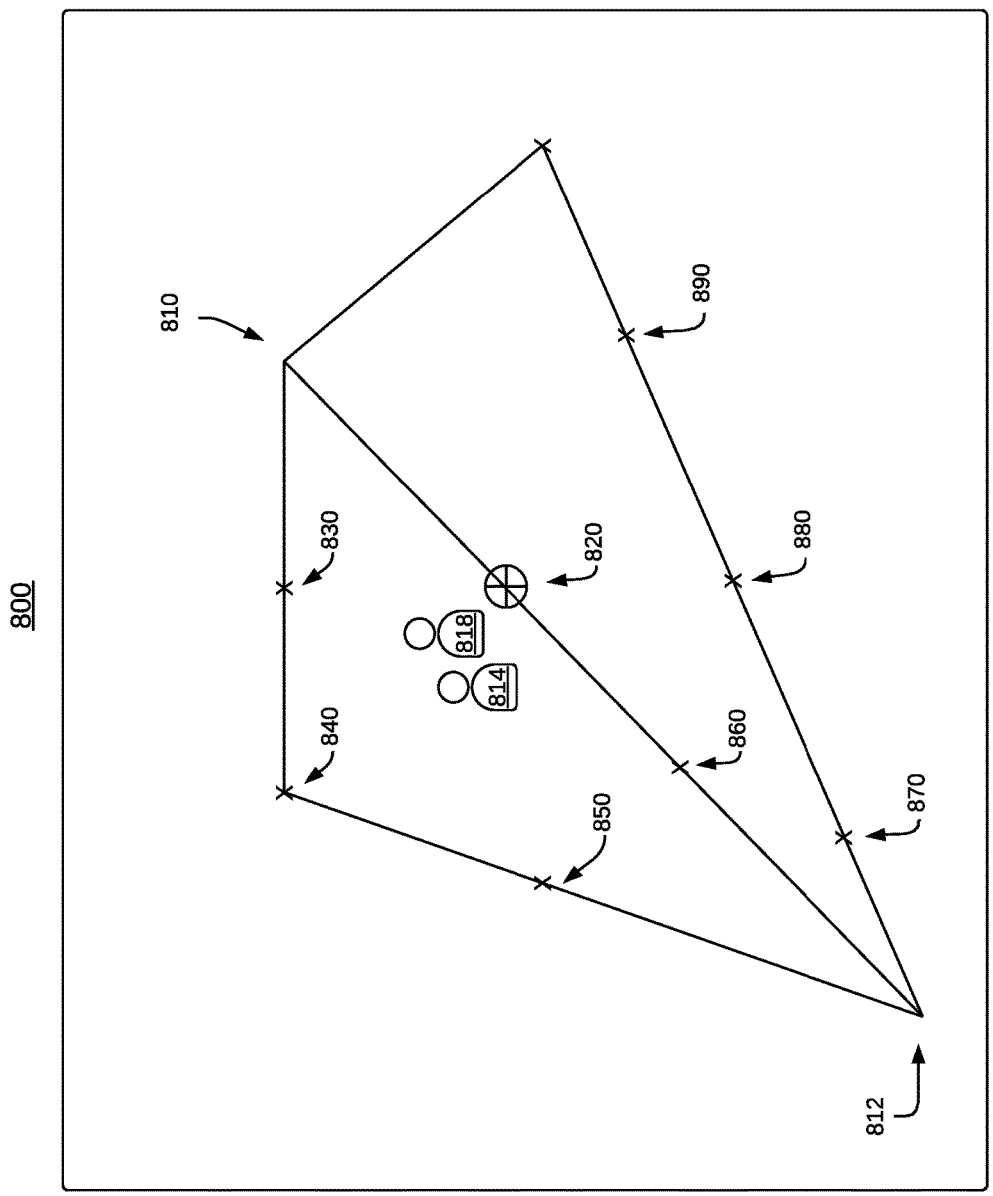
FIG. 8 is an illustrative schematic diagram showing a map for camera array placement and selection, according to one embodiment of the present invention.

FIG. 8 is a schematic diagram showing a map or minimap 800 for camera array placement and selection, according to one embodiment of the present invention. This example is taken from a computer video gaming application, where map 800 illustrates a current game play of an online battle arena game where three paths or lanes exist between bases 812 and 810 of two opposing teams, and where two players represented by avatars 814 and 818 each tries to destroy the enemy's base. In this particular segment of the game play, players 814 and 818 meet along the middle lane to battle against each other. In this example, eight virtual camera arrays are provided by a SLIVER server, with two virtual camera arrays 820 and 860 placed along the middle lane, three virtual camera arrays 830, 840, and 850 placed along the upper lane, and three virtual camera arrays 870, 880, and 890 placed along the lower lane. Each virtual camera array may have different virtual camera arrangements, two examples of which are provided by FIGS. 9 and 10. In some embodiments, a SLIVER server may employ a graphic analyzer to analyze tradeoffs between processing power and a number of virtual camera arrays to be provided, tradeoffs among different camera array positions, camera array arrangements, camera orientations and capturing frequencies, as well as other similar characteristics, to determine the number of virtual camera arrays and corresponding virtual camera array positions to provide for video recording.

In what follows, two specific examples are discussed for virtual camera array selection for spherical media generation based on the game play shown in FIG. 8. In a first example, a SLIVER server analyses the game play as displayed on game map 800 to activate and select virtual cameras and virtual camera arrays for spherical media generation. In this particular example, all virtual cameras within all virtual camera arrays shown in FIG. 8 may be used to capture game actions and environment in 360-degrees. As the game play shown in FIG. 8 progresses, the SLIVER system may detect player positions as being within a battle field visible from virtual camera arrays 820, 830, 850 and 860, where the other four virtual camera arrays 840, 870, 880, and 890 are either obscured, or too distant to produce a game video capture with acceptable visual quality. In some embodiments, the SLIVER system may further determine that virtual camera array 820 is closest to the battle field, provides a best viewing perspective for the current segment of the game play, and should be selected for game video capture. In addition, a center offset position and distance may be determined for non-concentric spherical projection, based on the position of the virtual camera array relative to the event or scene of interest. In this example, virtual camera array 820 may be activated to capture the game play as it happens in the upper left half of the game map, above the middle lane. As such game play recordings are captured, they may be processed via non-concentric spherical projection, where the upper left direction is taken as a high-resolution "front" direction, and the lower right direction is taken as a low-resolution "back" direction, with the center offset position leans towards the lower right direction. As game actions further evolve, players 814 and 818 may move along the middle lane towards virtual camera array 860, and the SLIVER system may automatically switch from the camera array 820 to the camera array 860 for game video capture and corresponding non-concentric spherical projection.

In a second example, a SLIVER server may analyze the game play as displayed on game map 800, yet also allow user input for virtual camera array selection for spherical media generation. After virtual camera arrays 820, 830, 850 and 860 are determined to be usable for game video capture, the SLIVER server may, for each of these four virtual camera arrays, perform game video capture. Thus, each virtual camera array may be utilized to generate 360-degree views at respective camera array locations. A spectator may then select among the four available virtual camera arrays, and the SLIVER server streams corresponding 360-degree videos for viewing in an immersive VR environment.

In the two examples discussed above, when more than one virtual camera array is available for video capture, virtual camera array selection and switching throughout a game streaming session is very important for providing a stimulating immersion experience. In various embodiments of the present invention, camera array selection may be performed automatically by the system, according to user input, or using a combination of both. System selections based on optimized viewing perspectives may be determined through a graphical analysis of available camera array locations within a map with respect to one or more positions within the map, map contents such as terrain configurations and architectural plans within the map, as well as other viewing settings such as desired viewing distance and viewing angles. In the gaming example shown in FIG. 8, virtual camera array 820 may be automatically selected by the system to capture the current battle between players 814 and 818 because it provides a shortest viewing distance. Alternatively, camera array 830 may be selected by the system instead, to provide a larger viewing distance that may allow a more integral view of special effects associated with the battle play. By comparison, a user such as a player, a broadcaster, or a spectator may choose any one of the eight available virtual camera arrays shown in map 800 for game video capture. In any of the exemplary cases above, a high-resolution "front" direction may be determined automatically by the system or manually by a user, based on, for example, the position of the selected camera array relative to the game action of interest, for non-concentric spherical video generation.

Figure 9:
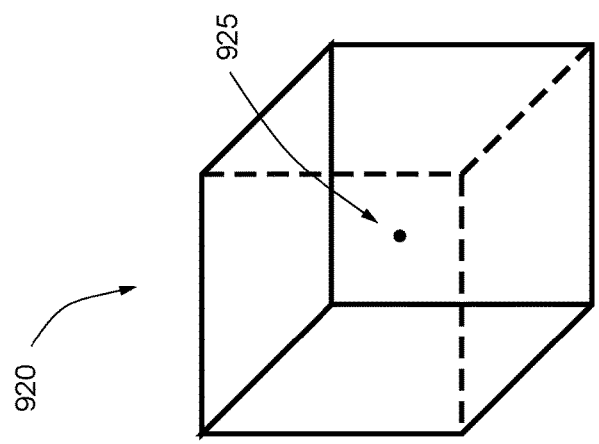
FIG. 9 is an illustrative example of a camera array arrangement for 360-degree capture and corresponding video plane configuration, according to one embodiment of the present invention.
Figure 9:
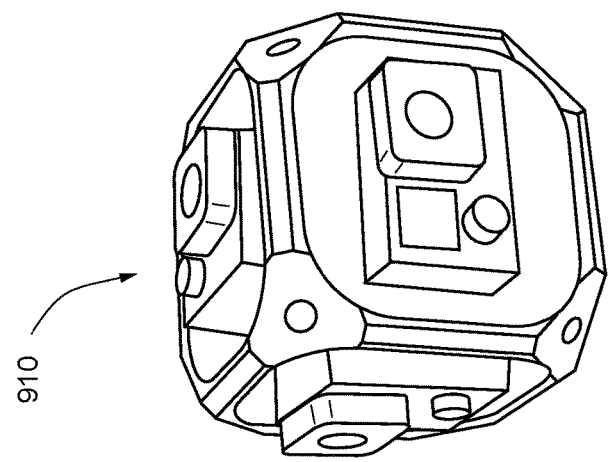
Figure 10:
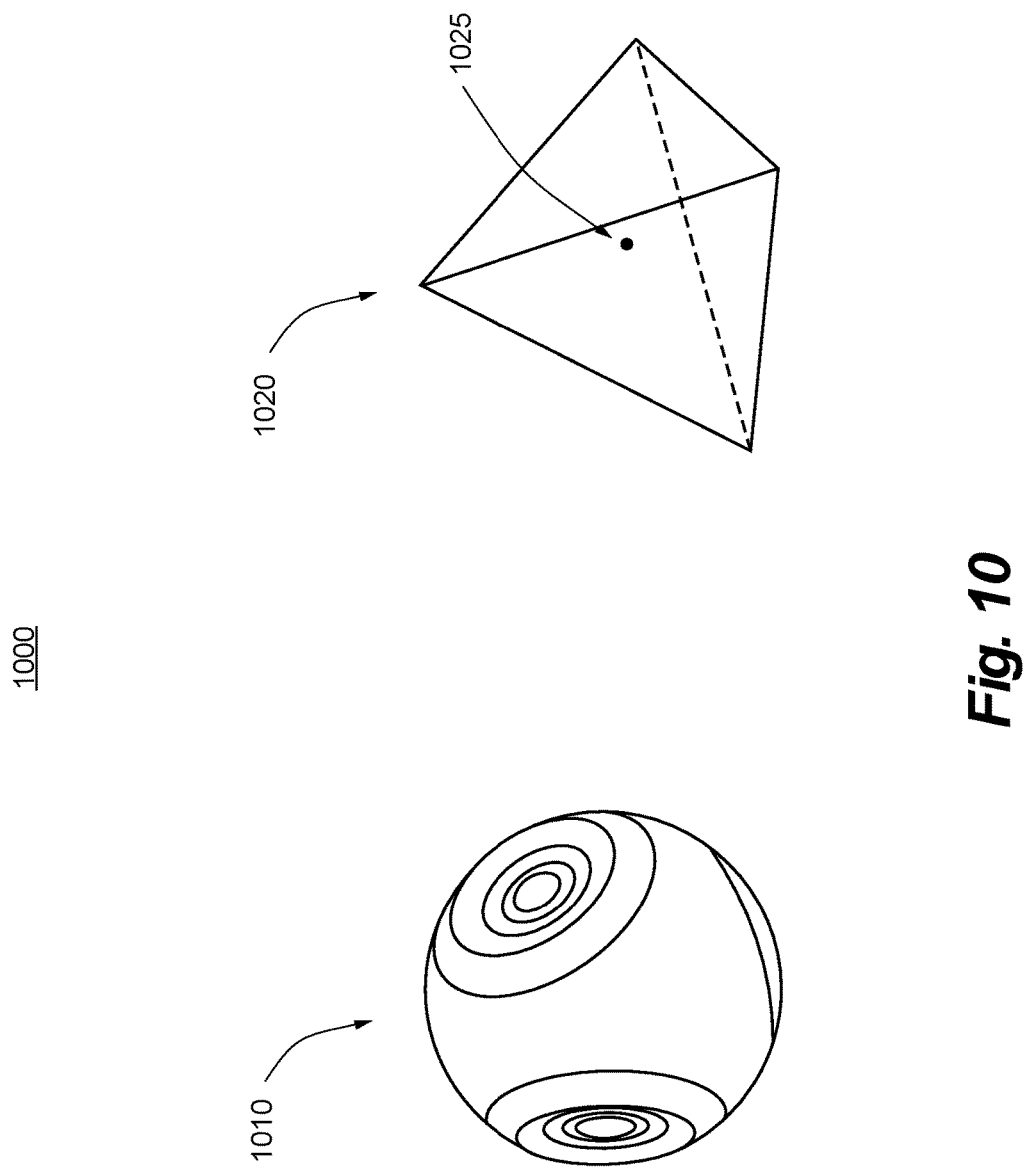
FIG. 10 is another illustrative example of a camera array arrangement for 360-degree capture and corresponding video plane configurations, according to one embodiment of the present invention.

FIGS. 9 and 10 illustrate relationship between cubic and tetrahedral camera arrangements and resulting imaging planes, respectively. FIG. 9 show a cubic camera array configuration 910 with six cameras each facing away from a center point, and FIG. 10 shows a tetrahedral camera array configuration 1010 with four cameras each facing away from a center point.

Cubic arrangement 910 comprises six cameras each pointing towards complementary and orthogonal directions including front, back, left, right, top, and bottom, where such directions may be defined relatively depending on a desired position and orientation of the camera array. As each camera may have a viewing angle of 170 degrees covering the far left to the far right, taking six shots at the same time provides six planar images or recordings, shown as cubic imaging planes 920 that capture the full 360-degree horizontal and 180-degree vertical environment surrounding a specific reference center point 925. This center point for the cubic camera array may be used for non-concentric spherical projection. In a computer video gaming application, this center point may also be used to track the movement of a player's character within the game world, with configurable tracking precision. Alternatively, such a reference center point may be static or fixed within the immersive environment being recorded. In this example, each imaging plane is flat and square in shape. Typically, scenes are photographed or rendered to a rectangular image. In some embodiments, the imaging plane may be in polyhedral shapes other than rectangles. In more general cases, imaging planes of source recordings may be asymmetrical curved surfaces surrounding the viewpoint center.

FIG. 10 is another exemplary camera arrangements in the form of a triangular pyramid or tetrahedron 1010 with four cameras to capture 360 degrees horizontally and 180 degrees vertically. The four imaging planes form a regular tetrahedron 1020 with center point 1025. Again, center point 1025 may be used for configuring a non-concentric spherical projection process, and may be associated with predetermined positions within the immersive environment being recorded. Compared with the cubic camera arrangement shown in FIG. 9, having a fewer number of cameras may be more resource efficient.

In various embodiments, a camera array utilized by the SLIVER system may be user configurable, and may include any number of cameras arranged in any geometric shape, with each camera orientated in any desired direction, around an approximate or exact center location. In embodiments with physical cameras, a camera array may be limited by camera form factors. In embodiments with virtual cameras only, a virtual camera array arrangement is limited instead by computing resources for image rendering and transfer. In both cases, tradeoffs exist in processing speed, throughput, or data transmission bandwidths between different data processing modules.

In some embodiments, a camera array utilized by the SLIVER system may cover less than 360 degrees horizontally or 180 degrees vertically. For example, configuration options may be provided for a user to choose from one or more pre-defined camera array arrangements, to disable one or more cameras within a camera array and possibly reducing the overall field of view, to modify camera positions or orientations, or to define personalized camera arrays with configurable arrangements and camera characteristics.

In some embodiments, cameras within a camera array are operated synchronously, with the same capture resolution and frame rate. In some other embodiments, cameras within the same camera array may be configured individually to operate under separate resolution and frame rate settings. For example, a front facing camera within cubic arrangement 910 may be configured to capture at a higher resolution with double the frame rate than a side-facing camera. A concentric or non-concentric projection may be performed on such input data with different spatial and/or temporal resolutions.

Figure 11:
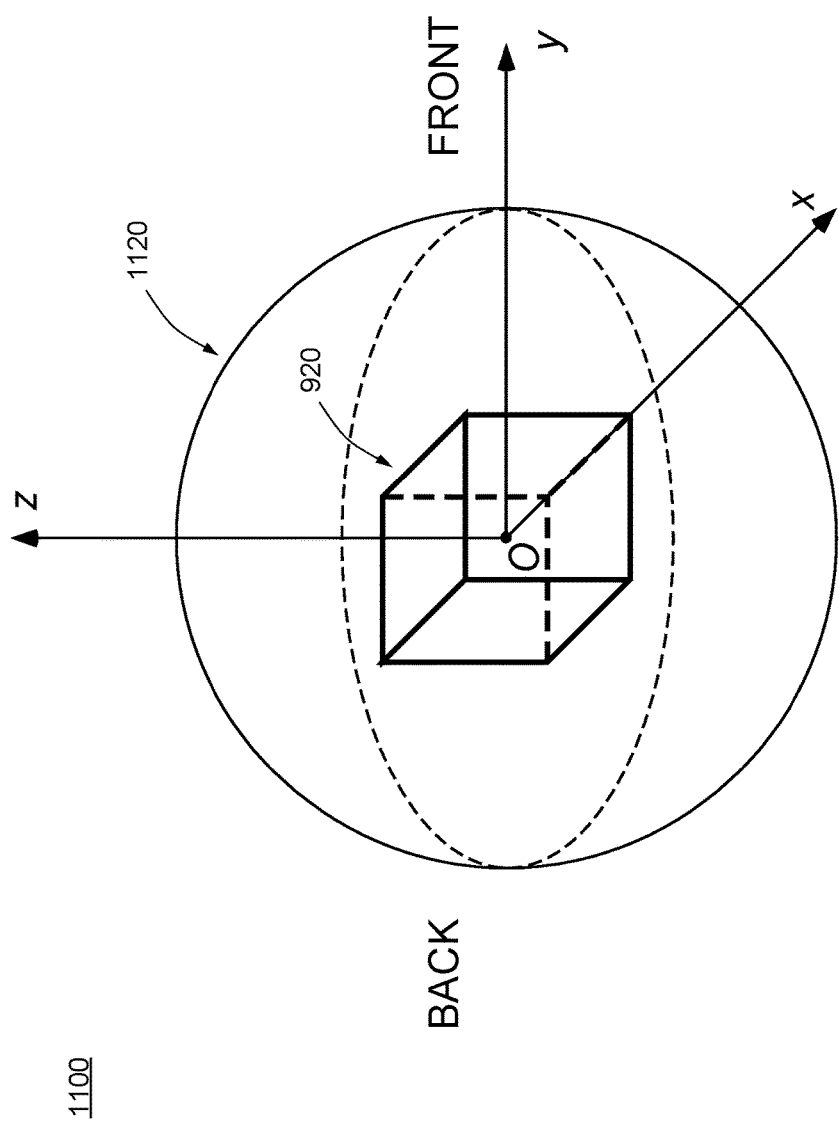
FIG. 11 is a diagram illustrating a concentric spherical projection from a cubic environment to a sphere map, according to one embodiment of the present invention.
Figure 12:
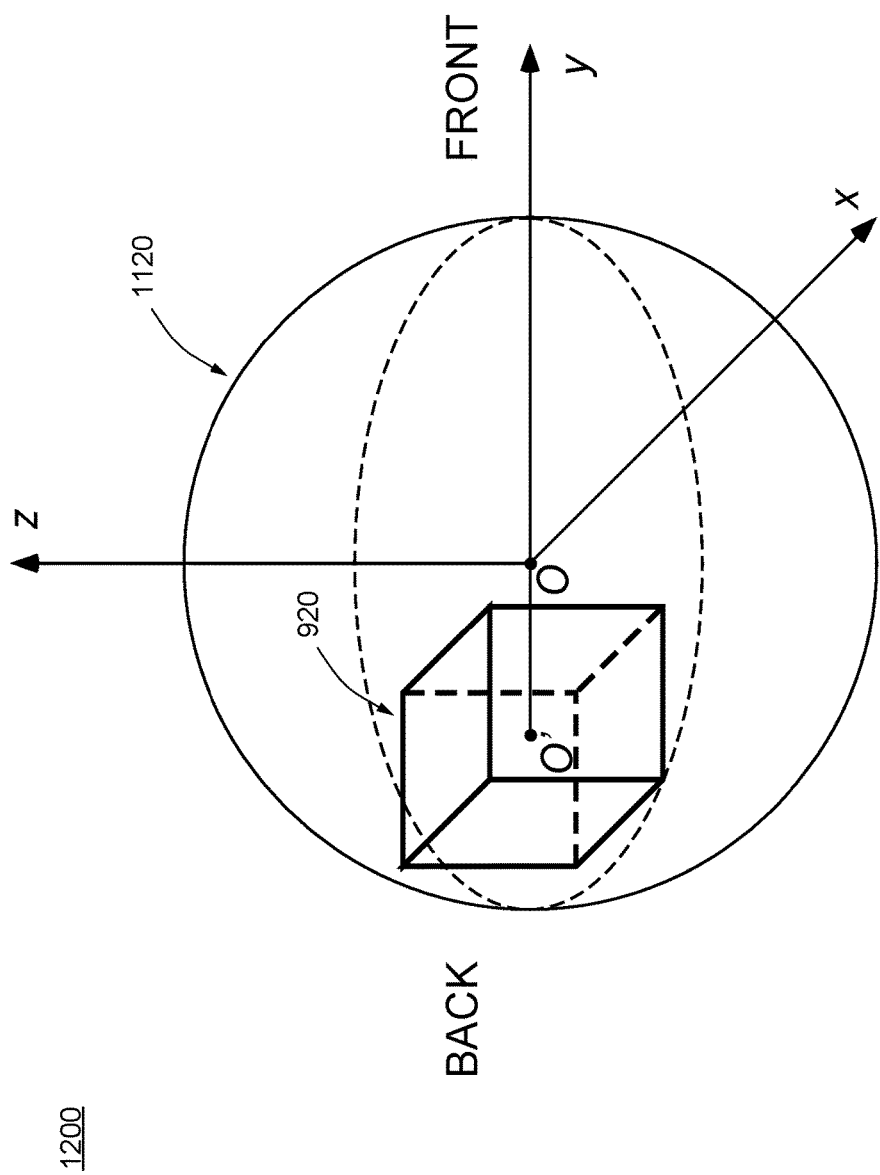
FIG. 12 is a diagram illustrating a non-concentric spherical projection from a cubic environment to a sphere map, according to one embodiment of the present invention.

FIG. 11 is a diagram 1100 illustrating a concentric projection from cubic imaging planes 920 to a projection sphere or a spherical map 1120, or vice versa. As a comparison, FIG. 12 is a diagram 1200 illustrating a non-concentric projection from cubic imaging planes 920 to a spherical map 1220, or vice versa, according to one embodiment of the present invention. Cubic imaging planes 920 may be obtained using cubic camera array arrangement 910 shown in FIG. 9. In these figures, the y-axis points to a front or frontal direction. In the conventional concentric spherical projection shown in FIG. 11, also known as a equirectangular projection, the cubic imaging planes and the spherical map share the same center or origin O. In a non-concentric spherical projection such as shown in FIG. 12, the center of the cube is pulled back by a non-zero distance from origin O to O'.

To obtain a non-concentric spherical projection, FIGS. 13A, 13B, 13C, and 13D illustrate the non-concentric positioning of a 2D rectangular image ABCD within a unit sphere to map pixels from the 2D rectangular image to the sphere, according to one embodiment of the present invention.

Figure 13B:
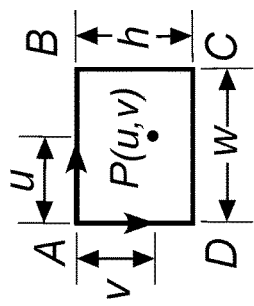
FIGS. 13A, 13B, 13C, and 13D are respective diagrams illustrating the non-concentric positioning of a 2D rectangular image within a unit sphere, according to one embodiment of the present invention.
Figure 13C:
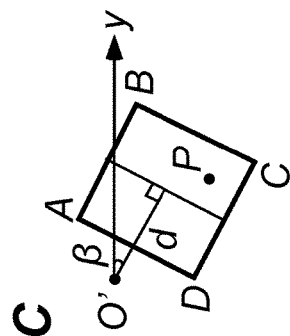
Figure 13D:
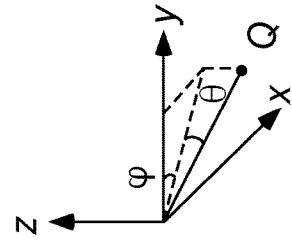
Figure 13A:
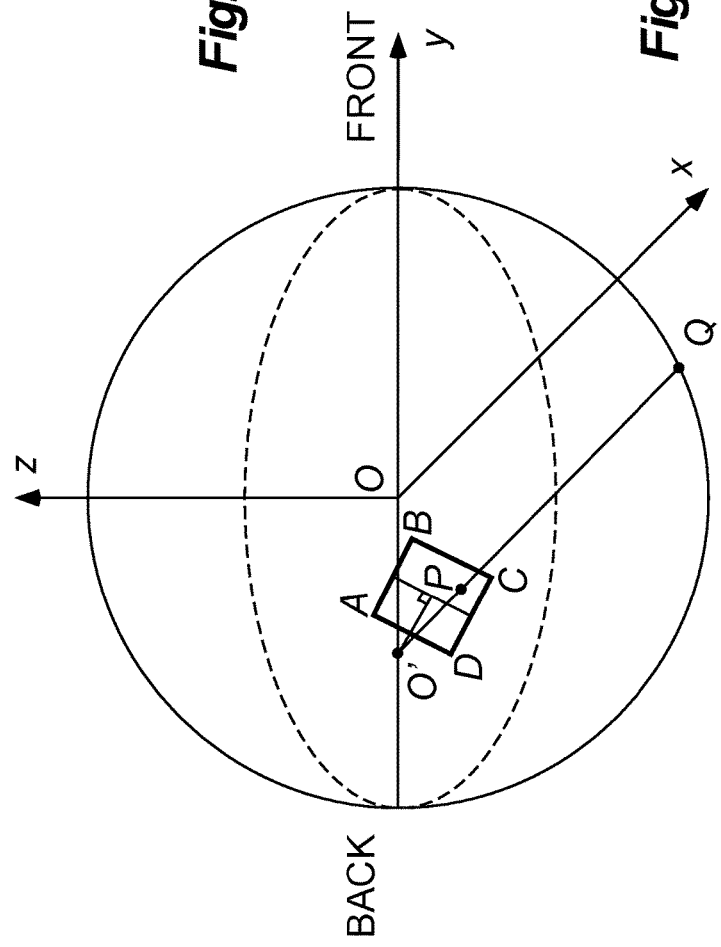

As shown in FIG. 13A, rectangular 2D image ABCD is positioned within the spherical space. Without loss of generality, assume edges of the 2D image ABCD is not necessarily perpendicular to the x/y/z-axis like the faces of the cubic imaging planes such as shown in FIG. 12, while line segment AB is parallel to plane xy, and BC is parallel to plane yz. The angle between the z-axis and plane ABCD is equivalent to the angle between the y-axis and the normal to plane ABCD shown in FIG. 13C. Denote this angle as β. Assume radius of the sphere is 1, so the projection sphere is a unit sphere centered at origin O. A distance from the projection origin O' to image ABCD is d. The coordinate of O' is (O, −t, O), where t is a constant representing a distance between the center of the projection unit sphere and the point O', which corresponds to the center of a camera array for capturing image ABCD.

As shown in FIG. 13B, on image ABCD, set a normalized coordinate system uv where the origin is the top-left corner A. Denote the width AB of image ABCD by w, and the height BC by h.

Given a point Q with polar coordinates (cos θ sin φ, cos θ cos φ, −sin θ) on the unit sphere, the non-concentric spherical projection problem may be viewed as a process of finding a corresponding pixel P(u,v) on image ABCD, so the RGB color of point Q may be determined from that of point P, where P has been rendered, captured, or recorded by a camera centered at O'. In other words, a projected pixel Q on the projection sphere is mapped from a source pixel P in a source recording, and this source pixel may be viewed as a point of intersection between the source recoding and a line segment connecting the projected pixel on the projection sphere and the virtual camera array center O'. In practice, as pixels are discrete, it would be understood by persons of ordinary skill in the art that pixel locations may be approximate, and pixel mixing or averaging may be performed in some embodiments of the present invention.

To determine pixel P(u,v), a two-step process may be performed. Given $$\|AB\| = w, \|BC\| = h, Q = \begin{pmatrix} \cos\theta\sin\varphi \\ \cos\theta\cos\varphi \\ -\sin\theta \end{pmatrix},$$

first, a sphere centered at O' may be constructed, where a conventional equirectangular projection may be performed to map image ABCD to sphere O'. Second, sphere O' may be mapped to sphere O. Mathematically, the first step is to determine mapping $(u,v)=g(\theta',\varphi')$, and the second step is to determine mapping $(\theta',\varphi')=e(\theta,\varphi)$, where the mapping from $(\theta,\varphi)$ to $(u,v)$ is the composition $(u,v)=g\circ e(\theta,\varphi)$.

Figure 14:
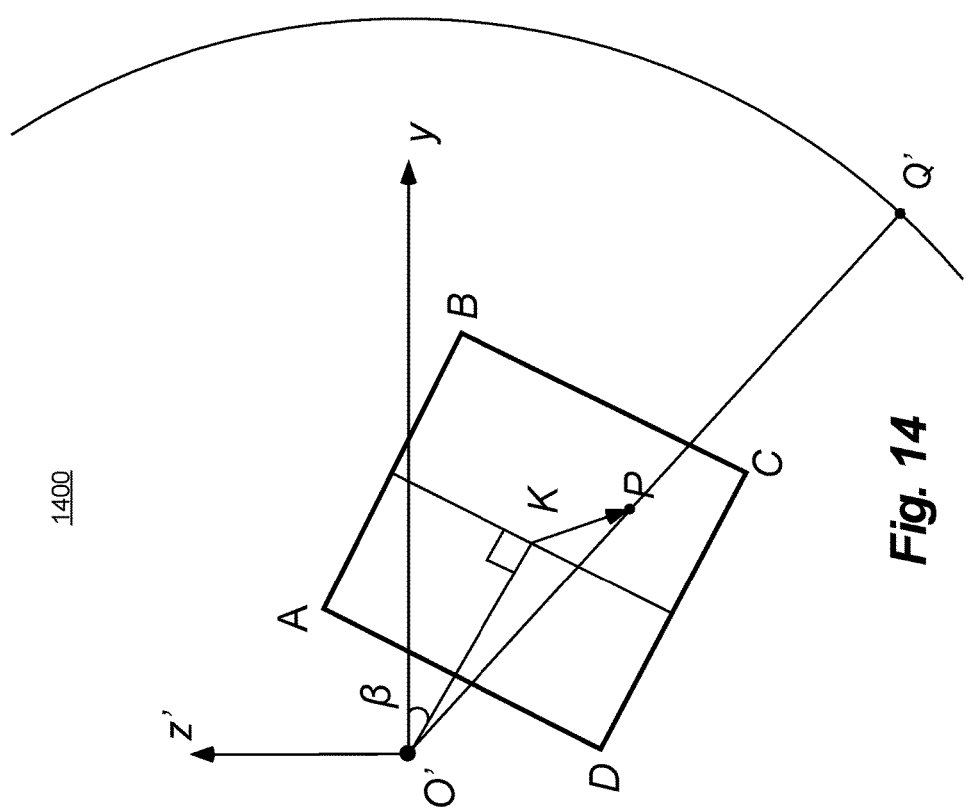
FIG. 14 is a diagram illustrating the projection of a point onto the 2D rectangular image shown in FIG. 13A, according to one embodiment of the present invention.

FIG. 14 is a diagram 1400 illustrating the projection of a point P on 2D rectangular image ABCD to corresponding point Q' on a unit sphere centered at O', according to one embodiment of the present invention. In this step, denote the center of image ABCD by $K(x_k,y_k,z_k)$, and the (x,y,z) coordinate of P by $P(x_p,y_p,z_p)$. Thus, given that the normalized coordinate of K on ABCD is $$\left(\frac{1}{2}, \frac{1}{2}\right),$$

the coordinate of point Y may be derived as follows:

$$\overrightarrow{O'P} = \overrightarrow{O'K} + \overrightarrow{KP} \quad (1)$$

$$\begin{bmatrix} x_p \\ y_p \\ z_p \end{bmatrix} = \begin{bmatrix} x_k \\ y_k \\ z_k \end{bmatrix} + \begin{bmatrix} w\left(u-\frac{1}{2}\right) \\ -h\left(v-\frac{1}{2}\right)\sin\beta \\ -h\left(v-\frac{1}{2}\right)\cos\beta \end{bmatrix} = \begin{bmatrix} 0 \\ d\cos\beta \\ -d\sin\beta \end{bmatrix} + \begin{bmatrix} w\left(u-\frac{1}{2}\right) \\ -h\left(v-\frac{1}{2}\right)\sin\beta \\ -h\left(v-\frac{1}{2}\right)\cos\beta \end{bmatrix}$$

$$\begin{bmatrix} x_p \\ y_p \\ z_p \end{bmatrix} = \begin{bmatrix} w\left(u-\frac{1}{2}\right) \\ d\cos\beta - h\left(v-\frac{1}{2}\right)\sin\beta \\ -d\sin\beta - h\left(v-\frac{1}{2}\right)\cos\beta \end{bmatrix}.$$

On the other hand, since O'P∥O'Q', the coordinate of point P may be written as follows, with r being an intermediate variable to represent the length of O'P:

$$\begin{bmatrix} x_p \\ y_p \\ z_p \end{bmatrix} = r \begin{bmatrix} \cos\theta'\sin\varphi' \\ \cos\theta'\cos\varphi' \\ -\sin\theta' \end{bmatrix}. \quad (2)$$

From Equations (1) and (2), the mapping from $(\theta',\varphi')$ to $(u,v)$ may be derived as $$\begin{bmatrix} u \\ v \end{bmatrix} = g(\theta', \varphi') = \begin{bmatrix} \dfrac{d}{w} \cdot \dfrac{(\sin\beta + f\cos\beta)\sin\varphi'}{\tan\theta'} + \dfrac{1}{2} \\ \dfrac{d}{h} \cdot f + \dfrac{1}{2} \end{bmatrix},$$

where $$f(\theta', \varphi') = \frac{\cos\beta\tan\theta' - \sin\beta\cos\varphi'}{\sin\beta\tan\theta' + \cos\beta\cos\varphi'}.$$

Figure 15:
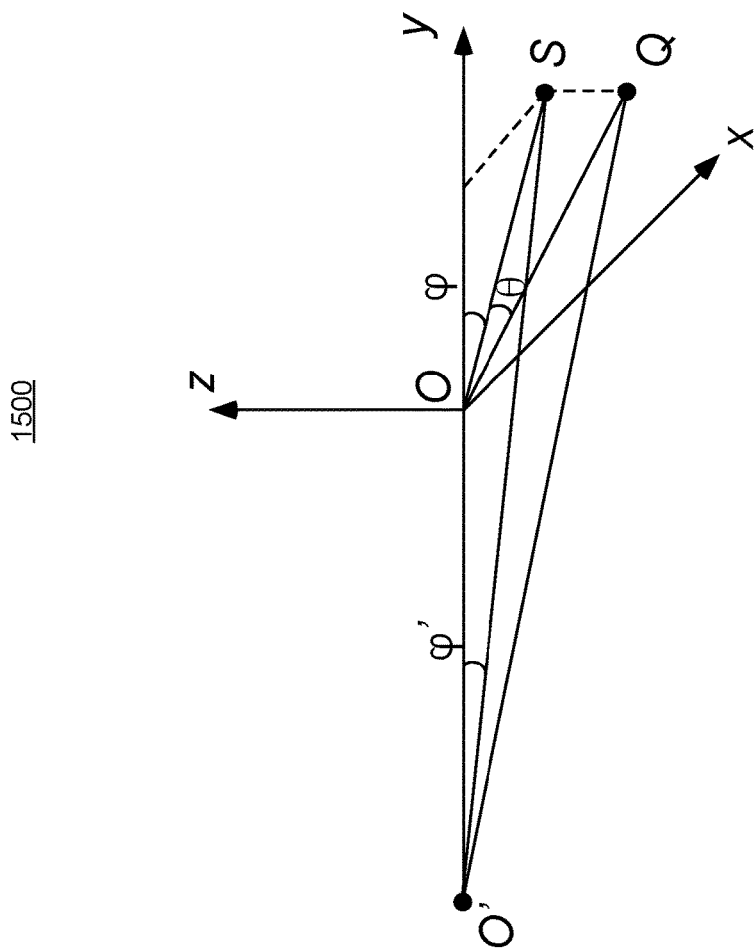
FIG. 15 is a diagram illustrating a coordinate transformation, according to one embodiment of the present invention.

FIG. 15 is a diagram 1500 illustrating a coordinate transformation, according to one embodiment of the present invention. In this step, denote the projection point of Q on plane xy by S, then $$\sin\varphi' = \frac{x_Q}{\|O'S\|} = \frac{\cos\theta\sin\varphi}{\sqrt{[(\cos\theta\cos\varphi)-(-t)]^2 + (\cos\theta\sin\varphi)^2}} = \frac{\cos\theta\sin\varphi}{\sqrt{\cos^2\theta + 2t\cos\theta\cos\varphi + t^2}},$$

and $$\varphi' = \sin^{-1}\frac{\cos\theta\sin\varphi}{\sqrt{\cos^2\theta + 2t\cos\theta\cos\varphi + t^2}},$$

$$\theta' = \tan^{-1}\frac{\sin\theta}{\sqrt{\cos^2\theta + 2t\cos\theta\cos\varphi + t^2}}.$$

Once the RGB color of every pixel on the unit sphere has been determined, an additional step may be performed to map the sphere to a 2D video frame, similar to the corresponding step in equirectangular projection. Assume the 2D video frame have width W and height H. Then the RGB pixel of a point (x,y) on the 2D video frame should correspond to a point $(\theta,\varphi)$, where $$\theta = \pi\left(\frac{y}{H} - 0.5\right), \varphi = 2\pi\left(\frac{x}{W} - 0.5\right).$$

To summarize, in this embodiment, to determine the RGB color or (R,G,B) pixel of a point (x,y) on a planar 2D video frame of the composite output spherical video, the corresponding point $(\theta,\varphi)$ on the unit sphere is first computed. Given the values of $(\theta,\varphi)$, coordinates (u,v) on image ABCD may then be determined, where image ABCD is captured by the in-game virtual cameras as (R,G,B) pixels. In other words, a source pixel at (u,v) may be first non-concentrically projected onto sphere O, then further projected onto the output 2D video frame, for output as a multi-resolution spherical video. The term "multi-resolution" here refers to assigning more pixels in the 2D video frame or on the unit sphere to one or more portions of the image ABCD or a source cube. The transition between high-resolution and low-resolution regions on the spherical projection may be gradual, without clear differentiating boundaries.

For example, the frontal side of a source cube may correspond to a larger portion of the unit sphere, and a larger portion of the output 2D video frame, which contains a larger number of pixels. In the computations discussed above, this larger number of pixels corresponds to very fine sampling of the frontal side of the source cube, thus requiring high-resolution rendering or capturing by a front-facing camera. On the other hand, as fewer pixels in the 2D video frame are allocated to the back side of the source cube, only a coarse sampling of the back side is necessary. Thus, a back-facing camera may be configured to capture at a lower resolution. Alternatively, a back-facing camera may capture at the same resolution as a front-facing camera, and the non-concentric projection process as disclosed herein inherently down-samples the captured video in generating the output 2D video frame.

EXAMPLES

Figure 16A:
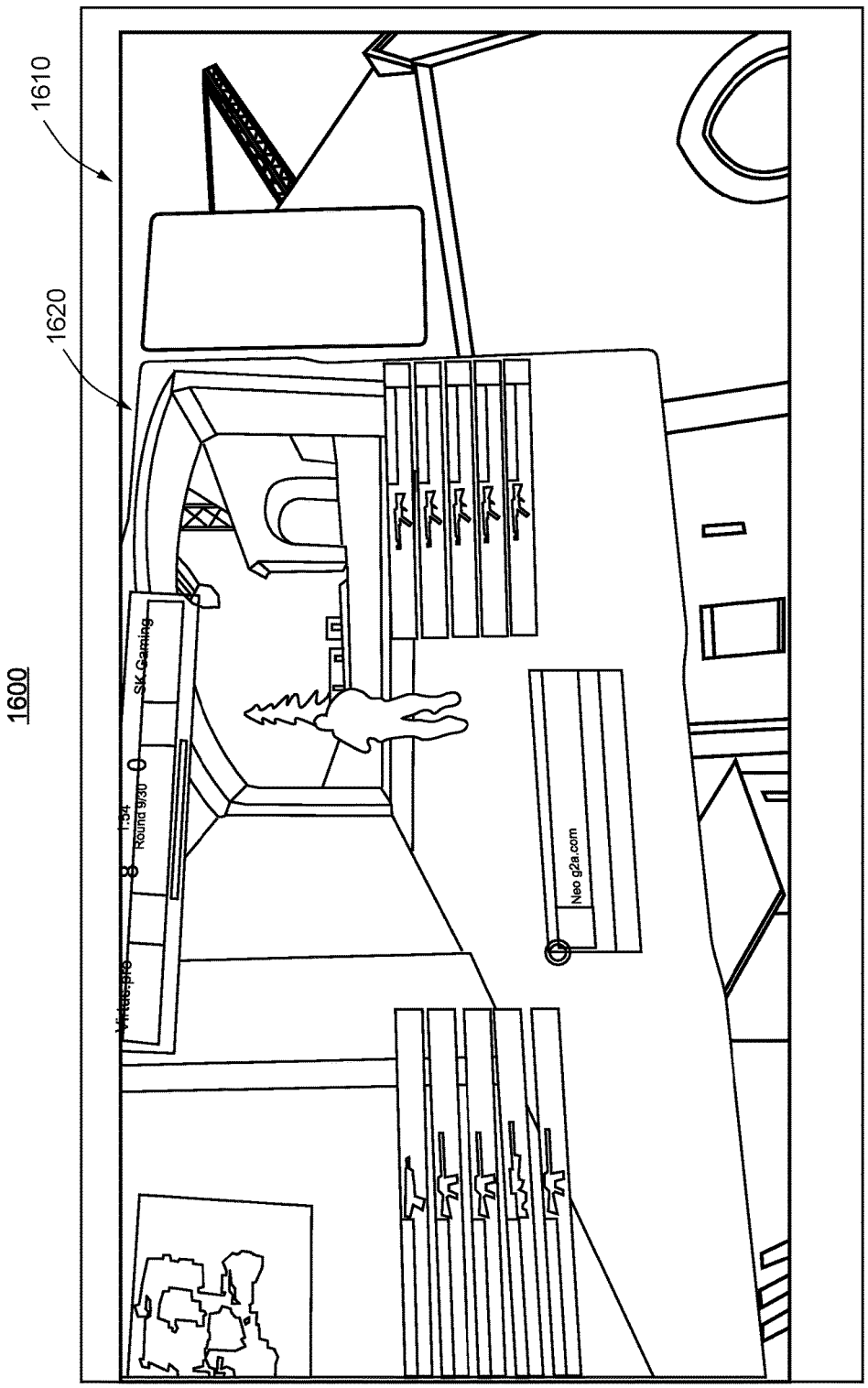
FIG. 16A is an exemplary screenshot of a high resolution frontal direction of a video game play, according to one embodiment of the present invention.
Figure 16B:
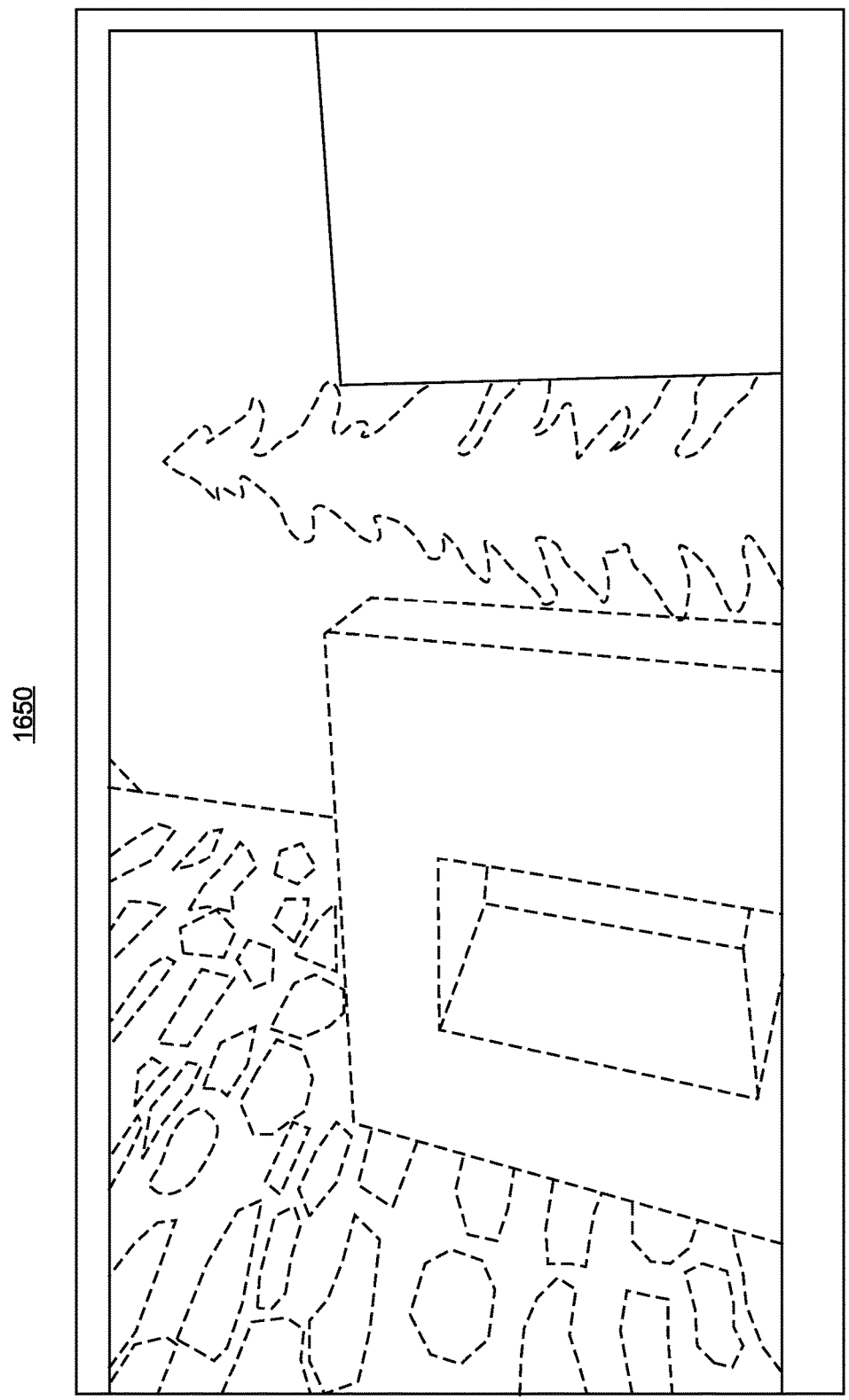
FIG. 16B is an exemplary screenshot of a low resolution back direction of the video game play referenced in FIG. 16A, according to one embodiment of the present invention.

FIG. 16A is an exemplary screenshot 1600 of a high-resolution frontal direction of a spherical video generated from a video game play, according to one embodiment of the present invention. FIG. 16B is an exemplary screenshot 1650 of a low-resolution back direction of the spherical video referenced in FIG. 16A. In this example, screenshot 1600 comprises a first-person view window 1610 captured by a first virtual camera array, and an overlay window 1620 showing footages taken by a second virtual camera array positioned at a distance behind the player. Screenshot 1650 is a corresponding first-person view taken by the first virtual camera array, but under lower visual resolutions obtained via non-concentric spherical projection.

Figure 17A:
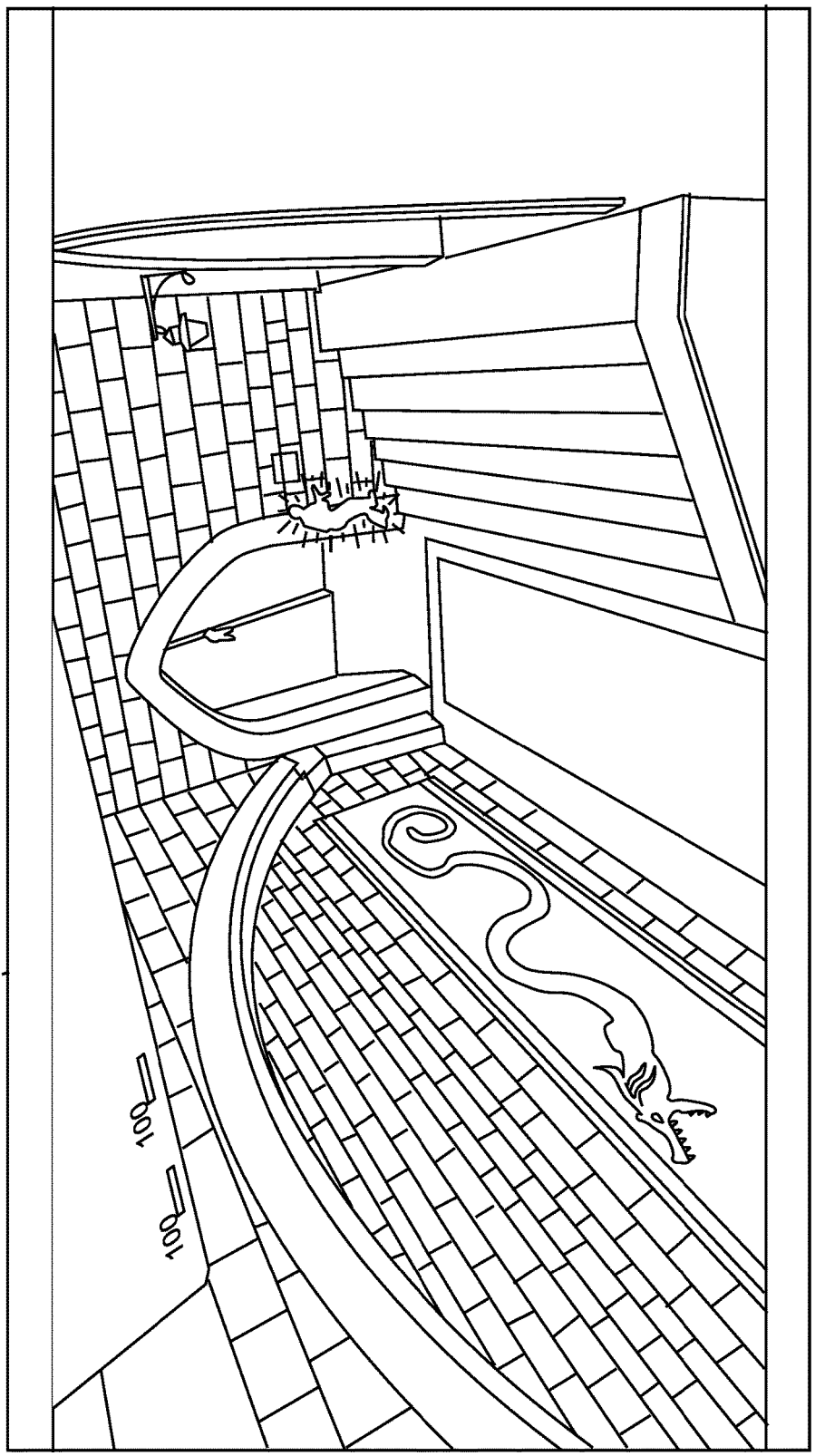
FIG. 17A is another exemplary screenshot of a high resolution frontal direction of a video game play, according to one embodiment of the present invention.

Similarly, FIG. 17A is another exemplary screenshot 1700 of a high-resolution frontal direction of a spherical video generated from a video game play, according to one embodiment of the present invention, while FIG. 17B shows a corresponding low-resolution back direction. Variations in resolutions are illustrated by the different visual clarities of the bricks and other objects shown in FIGS. 17A and 17B. The back direction is grainier in comparison to the frontal direction.

Figure 18:
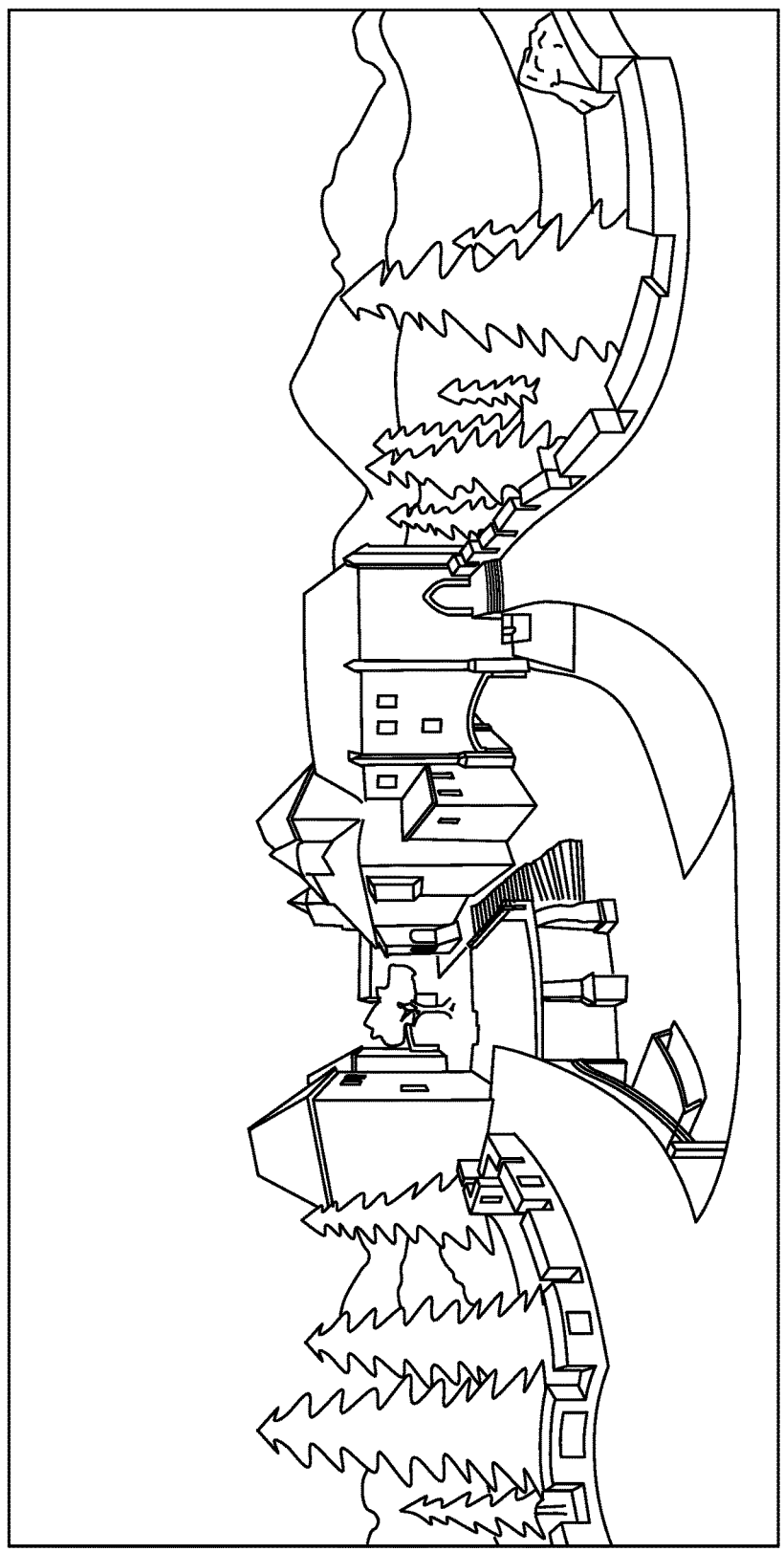
FIG. 18 is an exemplary screenshot of a spherical video of a first scene, derived by concentric spherical projection, according to one embodiment of the present invention.
Figure 19:
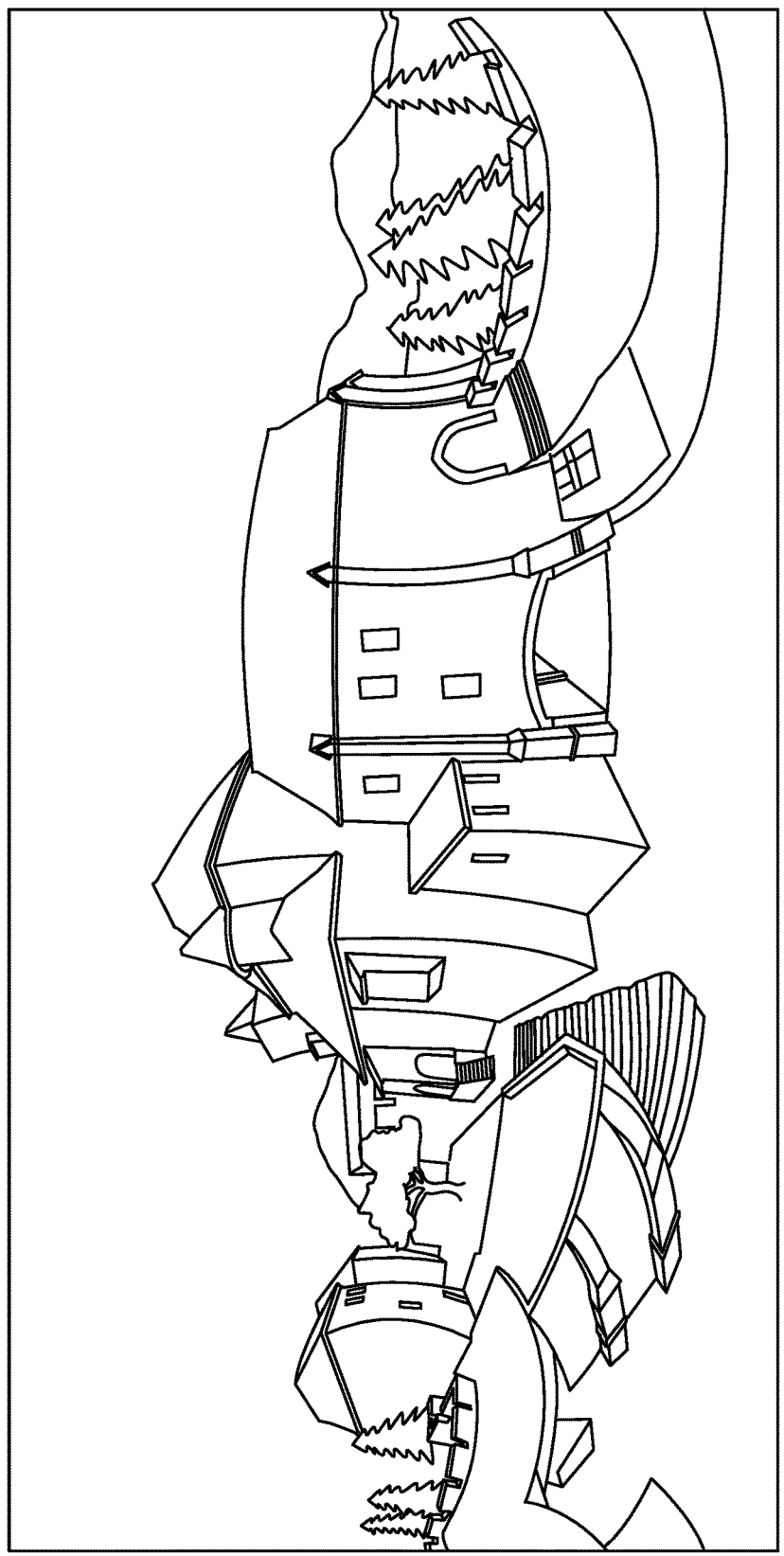
FIG. 19 is an exemplary screenshot of a spherical video of the scene in FIG. 18, derived by non-concentric spherical projection, according to one embodiment of the present invention.

FIG. 18 is an exemplary screenshot 1800 of a first spherical video of a first scene, the spherical video derived by concentric spherical projection. By comparison, FIG. 19 is an exemplary screenshot 1900 of a second spherical video of the same scene, the second spherical video derived by non-concentric spherical projection, according to one embodiment of the present invention. Compared to screenshot 1800, screenshot 1900 is more "zoomed-in" towards the center portion, corresponding to a high-resolution frontal direction in the virtual reality environment. This effect is the result of allocating more pixels to the frontal direction, as disclosed herein.

Figure 20:
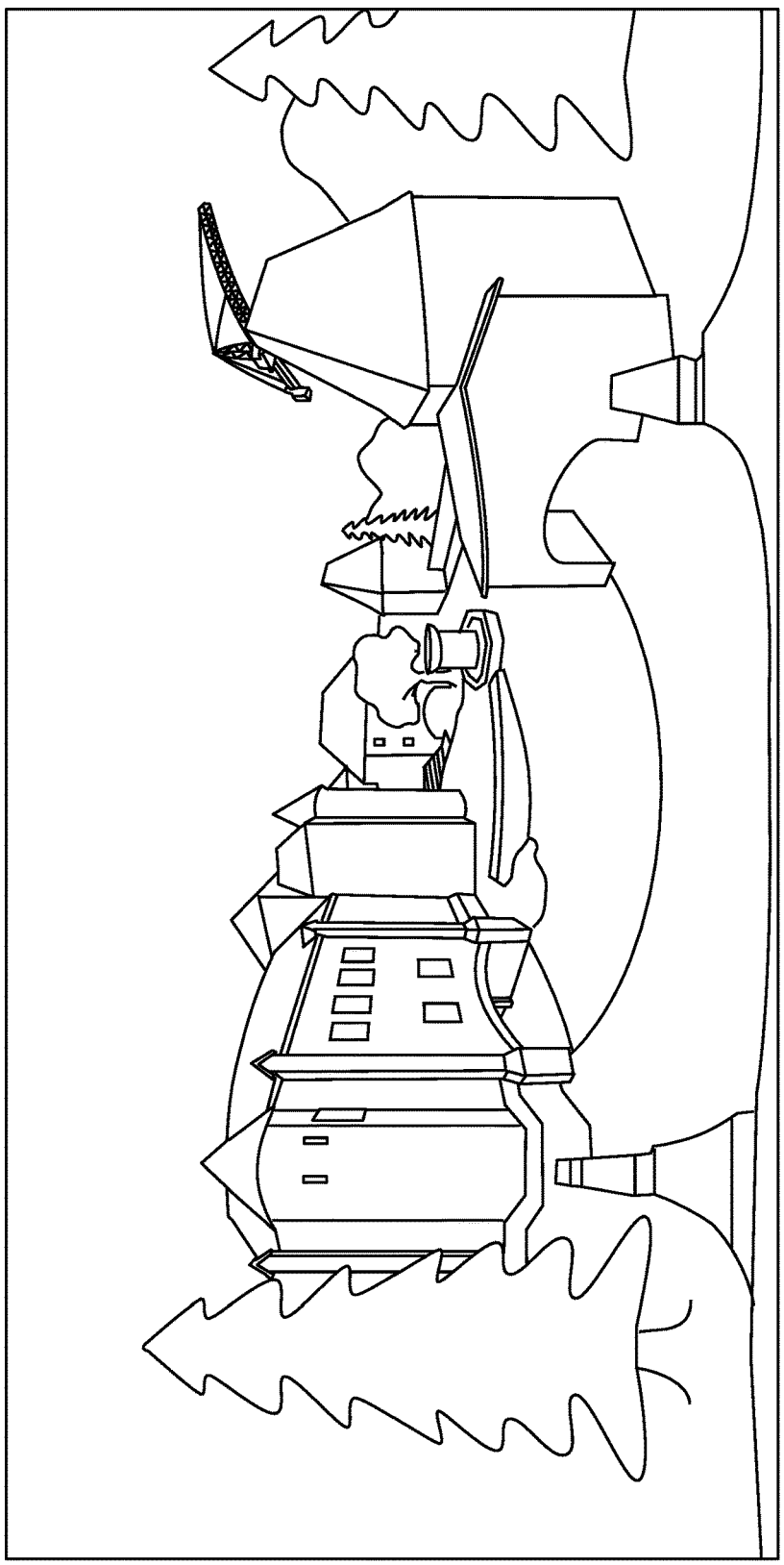
FIG. 20 is an exemplary screenshot of a spherical video of a second scene, derived by concentric spherical projection, according to one embodiment of the present invention.
Figure 21:
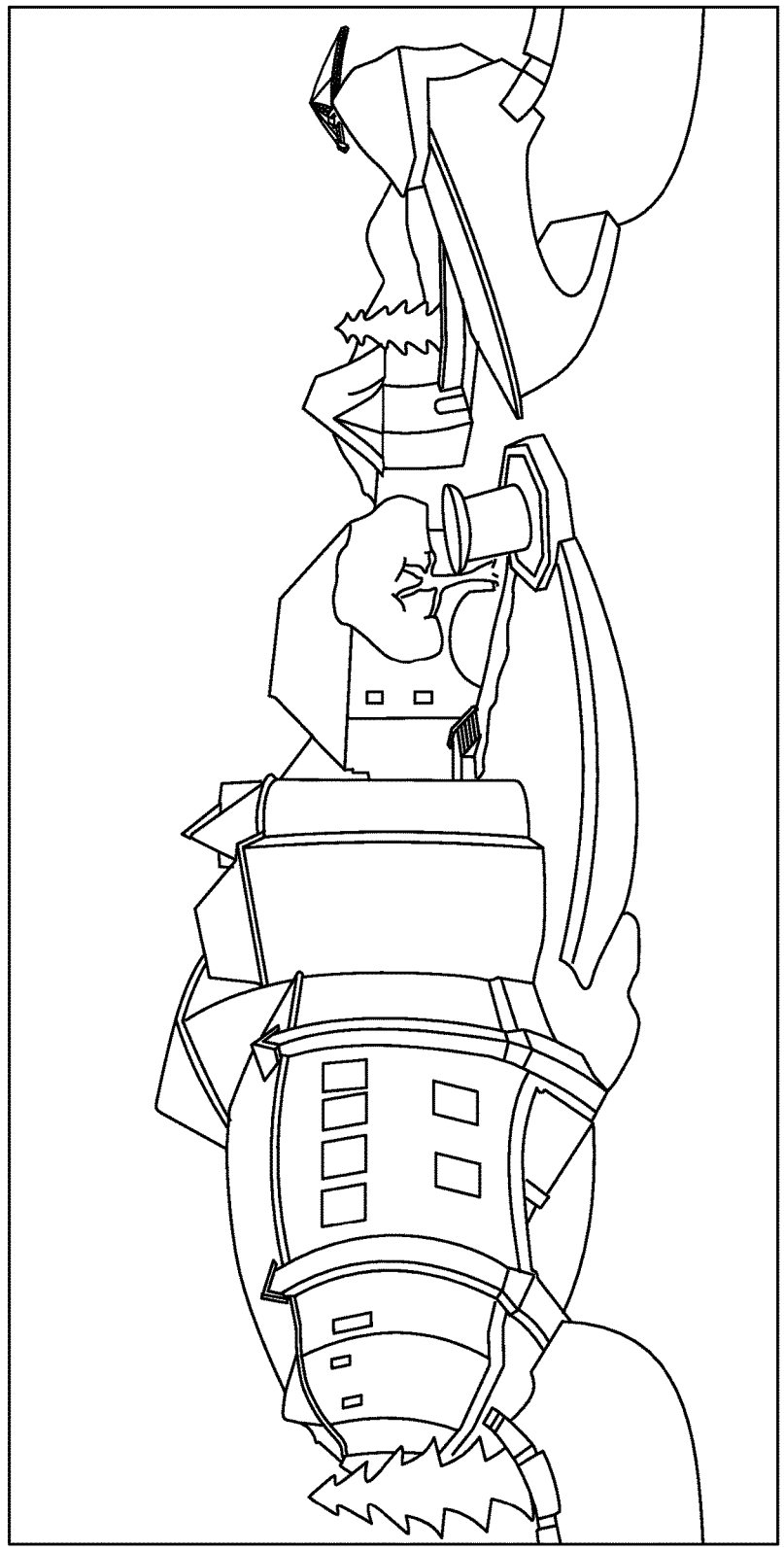
FIG. 21 is an exemplary screenshot of a spherical video of the scene in FIG. 20, derived by non-concentric projection, according to one embodiment of the present invention.

Similarly, FIG. 20 is an exemplary screenshot 2000 of a first spherical video of a second scene, the first spherical video derived by concentric spherical projection. By comparison, FIG. 21 is an exemplary screenshot 2100 of a second spherical video of the second scene, the second spherical video derived by non-concentric spherical projection, according to one embodiment of the present invention. Again, the front center direction is shown with higher resolution with more pixel allocation.

Implementations

Figure 22:
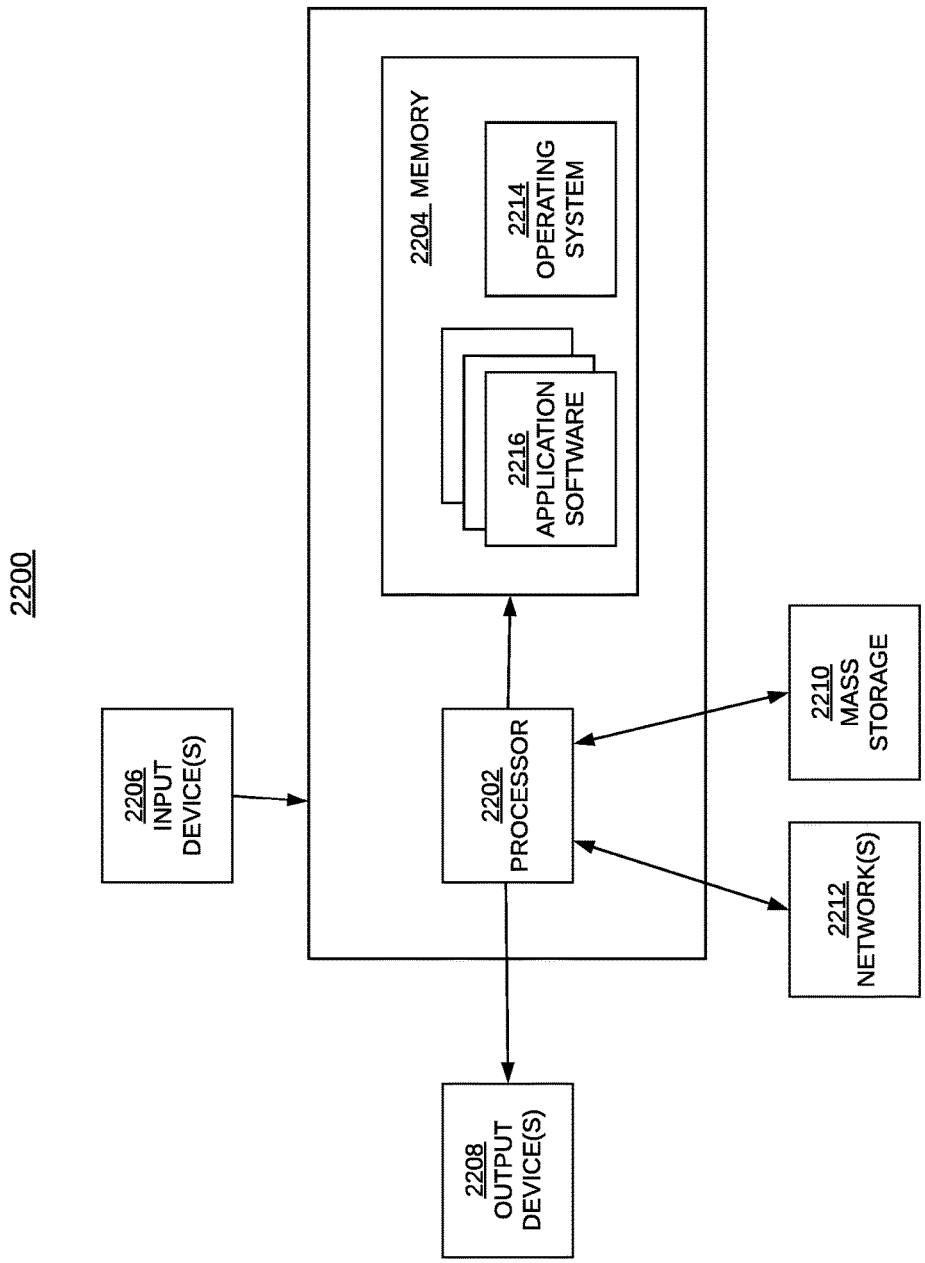
FIG. 22 is a schematic diagram of a computing device in which the present invention may be utilized, according to some embodiments of the present invention.

Finally, FIG. 22 is a schematic diagram 2200 of a computing device in which the present invention may be utilized, according to some embodiments of the present invention. A computing device comprises a hardware processor 2202 for executing program code, an operating system 2214, an application software 2216, which may implement the various embodiments of the present invention described herein, a physical memory 2204, at least one user device 2206, at least one output device 2208, a mass storage device 2210, and a network 2212. The network 2212 comprises a wired or wireless network to communicate to remote servers and databases via the Internet. The program code utilized by the computing device may be provided on a non-transitory physical storage medium, such as a local hard-disk, a hard-disk in the cloud, or any other physical storage medium (not shown).

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A system for generating spherical videos for multi-resolution view, comprising:
a processor; and
a non-transitory physical medium for storing program code, the non-transitory physical medium accessible by the processor, and the program code when executed causes the processor to:
receive a plurality of video recordings recorded by a viewpoint, wherein the viewpoint is a camera array comprising a plurality of cameras arranged around a viewpoint center, and wherein each camera faces a different direction away from the viewpoint center; and
generate a spherical video from the plurality of video recordings by non-concentric spherical projection, wherein each of the plurality of video recordings is mapped to respective portions of a projection sphere, wherein a center of the projection sphere is positioned at a non-zero distance away from the viewpoint center, and wherein a visual resolution of the spherical video in a first portion of the projection sphere is higher than a visual resolution of the spherical video in a second portion of the projection sphere.

2. The system of claim 1, wherein the non-concentric spherical projection is performed by:
generating a transitional video from the plurality of video recordings by a concentric spherical projection, wherein each of the plurality of video recordings is mapped to respective portions of a transitional sphere centered at the viewpoint center; and
mapping from the transitional sphere to the projection sphere.

3. The system of claim 1, wherein the program code when executed further causes the processor to:
select one of a plurality of camera arrays as the viewpoint, wherein each camera array comprises a plurality of cameras arranged around a center of the camera array, and
wherein each camera of each camera array faces a different direction, away from the center of the camera array.

4. The system of claim 3, wherein the selection of the viewpoint is based on a location within a map.

5. The system of claim 3,
wherein each camera array is positioned at a predetermined location, and
wherein each predetermined location is selected from the group consisting of a static location within a map, a tracking location associated with an object, a dynamic location controlled by a broadcaster, and a dynamic location controlled by a spectator.

6. The system of claim 1, wherein at least one camera of the camera array is a virtual camera.

7. The system of claim 1, wherein the camera array is a virtual camera array, and wherein the plurality of video recordings is recorded from a game play of a source computer game.

8. The system of claim 7, wherein the virtual camera array was inserted into the source computer game using a Software Development Kit (SDK) or a game connector module.

9. The system of claim 7, wherein the source computer game is selected from the group consisting of 2D games and 3D games, and wherein the source computer game lacks spherical video output.

10. The system of claim 7, wherein the source computer game is a virtual reality computer game that comprises spherical video output.

11. The system of claim 1,
wherein each projected pixel on the projection sphere is mapped from a source pixel in a source recording from the plurality of video recordings, and
wherein the source pixel is a point of intersection between the source recording, and a line segment connecting the projected pixel on the projection sphere and the center of the viewpoint.

12. The system of claim 1,
wherein the non-zero distance is measured by a normalized variable t,
wherein the projection sphere is a unit sphere parameterized by spherical coordinates $\theta$ and $\varphi$,
wherein for each projected pixel located at $$Q = \begin{bmatrix} \cos\theta\sin\varphi \\ \cos\theta\cos\varphi \\ -\sin\theta \end{bmatrix}$$

on the unit sphere, the source pixel is located at a normalized coordinate $$\begin{bmatrix} u \\ v \end{bmatrix},$$

wherein d is a constant based on a normalized distance of the source recording from the center of the viewpoint, wherein w, and h are constants based on a planar size of the source recording, wherein β is a constant based on an orientation of the source recording relative to the center of the viewpoint, and wherein $$\varphi' = \sin^{-1} \frac{\cos\theta \sin\varphi}{\sqrt{\cos^2\theta + 2t\cos\theta\cos\varphi + t^2}},$$

$$\theta' = \tan^{-1} \frac{\sin\theta}{\sqrt{\cos^2\theta + 2t\cos\theta\cos\varphi + t^2}},$$

$$f(\theta', \varphi') = \frac{\cos\beta\tan\theta' - \sin\beta\cos\varphi'}{\sin\beta\tan\theta' + \cos\beta\cos\varphi'}, \text{ and}$$

$$\begin{bmatrix} u \\ v \end{bmatrix} = \begin{bmatrix} \frac{d}{w} \cdot \frac{(\sin\beta + f\cos\beta)\sin\varphi'}{\tan\theta'} + \frac{1}{2} \\ \frac{d}{h} \cdot f + \frac{1}{2} \end{bmatrix}.$$

13. The system of claim 1, wherein the camera array is a physical camera array.

14. A method for generating spherical video for multi-resolution view, comprising:
receiving a plurality of video recordings recorded by a viewpoint, wherein the viewpoint is a camera array comprising a plurality of cameras arranged around a viewpoint center, and wherein each camera faces a different direction away from the viewpoint center; and
generating a spherical video from the plurality of video recordings by non-concentric spherical projection, wherein each of the plurality of video recordings is mapped to respective portions of a projection sphere, wherein a center of the projection sphere is positioned at a non-zero distance away from the viewpoint center, and wherein a visual resolution of the spherical video in a first portion of the projection sphere is different from a visual resolution of the spherical video in a second portion or the projection sphere.

15. The method of claim 14, wherein the non-concentric spherical projection is performed by:
generating a transitional video from the plurality of videos by a concentric spherical projection, wherein each of the plurality of recordings is mapped to respective portions of a transitional sphere centered at the viewpoint center; and
mapping from the transitional sphere to the projection sphere.

16. The method of claim 14, wherein the camera array is a virtual camera array, wherein the plurality of video recordings is recorded from a game play of a source computer game, and wherein the virtual camera array was inserted into the source computer game using a Software Development Kit (SDK) or a game connector module.

17. The method of claim 14, further comprising:
selecting one of a plurality of camera arrays as the viewpoint,
wherein each camera array comprises a plurality of cameras arranged around a center of the camera array, and
wherein each camera of each camera array faces a different direction, away from the center of the camera array.

18. The method of claim 17, wherein the selecting of the viewpoint is based on a location within a map.

19. The method of claim 17,
wherein each camera array is positioned at a predetermined location, and
wherein each predetermined location is selected from the group consisting of a static location within a map, a tracking location associated with an object, a dynamic location controlled by a broadcaster, and a dynamic location controlled by a spectator.

20. The method of claim 14, wherein the camera array is a physical camera array.

21. A non-transitory physical medium for storing program code, the program code executable by a processor to execute a process for generating multi-resolution spherical videos, the process comprising steps to:
receive a plurality of video recordings recorded by a viewpoint, wherein the viewpoint is a camera array comprising a plurality of cameras arranged around a viewpoint center, and wherein each camera faces a different direction away from the viewpoint center; and
generate a spherical video from the plurality of video recordings by non-concentric spherical projection, wherein each of the plurality of video recordings is mapped to respective portions of a projection sphere, wherein a center of the projection sphere is positioned at a non-zero distance away from the viewpoint center, and wherein a visual resolution of the spherical video in a first portion of the projection sphere is different from a visual resolution of the spherical video in a second portion or the projection sphere.

22. The non-transitory physical medium of claim 21, wherein the non-concentric spherical projection is performed by:
generating a transitional video from the plurality of videos by a concentric spherical projection, wherein each of the plurality of recordings is mapped to respective portions of a transitional sphere centered at the viewpoint center; and
mapping from the transitional sphere to the projection sphere.

23. The non-transitory physical medium of claim 21, wherein the program code when executed further causes the processor to:
select one of a plurality of camera arrays as the viewpoint,
wherein each camera array comprises a plurality of cameras arranged around a center of the camera array, and
wherein each camera of each camera array faces a different direction, away from the center of the camera array.

24. The non-transitory physical medium of claim 23, wherein the selection of the viewpoint is based on a location within a map.

25. The non-transitory physical medium of claim 23,
wherein each camera array is positioned at a predetermined location, and
wherein each predetermined location is selected from the group consisting of a static location within a map, a tracking location associated with an object, a dynamic location controlled by a broadcaster, and a dynamic location controlled by a spectator.

26. The non-transitory physical medium of claim 21, wherein the camera array is a physical camera array.

* * * * *